(12) United States Patent
Krause et al.

(10) Patent No.: US 10,958,478 B2
(45) Date of Patent: Mar. 23, 2021

(54) RESILIENT POLYMORPHIC NETWORK ARCHITECTURES

(71) Applicant: Securboration, Inc., Melbourne, FL (US)

(72) Inventors: Lee Krause, Indialantic, FL (US); Jacob Staples, Hooksett, NH (US)

(73) Assignee: Securboration, Inc., Melbourne, FL (US)

( * ) Notice: Subject to any disclaimer, the term of this patent is extended or adjusted under 35 U.S.C. 154(b) by 270 days.

(21) Appl. No.: 15/817,176

(22) Filed: Nov. 18, 2017

(65) Prior Publication Data

US 2018/0159701 A1 Jun. 7, 2018

Related U.S. Application Data

(60) Provisional application No. 62/424,359, filed on Nov. 18, 2016.

(51) Int. Cl.
*H04L 12/46* (2006.01)
*H04L 29/12* (2006.01)

(52) U.S. Cl.
CPC ...... *H04L 12/4641* (2013.01); *H04L 61/2514* (2013.01); *H04L 61/2521* (2013.01); *H04L 61/1511* (2013.01)

(58) Field of Classification Search
CPC ............ H04L 12/4641; H04L 61/2514; H04L 61/1511; H04L 61/20; H04L 63/14; H04L 63/1441; H04L 61/2521
USPC ........................................................ 709/223
See application file for complete search history.

(56) References Cited

U.S. PATENT DOCUMENTS

2013/0104228 A1* 4/2013 Burnham ............ H04L 63/1441
726/22
2016/0323300 A1* 11/2016 Boss ................... H04L 63/1416

FOREIGN PATENT DOCUMENTS

CN 104506511 A * 4/2015

OTHER PUBLICATIONS

Ehab Al-Shaer, Random Host Mutation for Moving Target Defense, 2013, EUDL, https://eudl.eu/pdf/10.1007/978-3-642-36883-7_19 (Year: 2013).*
Mohamed Azab, Smart Moving Target Defense for Linux Container Resiliency, Nov. 1-3, 2016, IEEE, https://ieeexplore.ieee.org/document/7809699 (Year: 2016).*
Ehab Al-Shaer, OpenFlow Random Host Mutation, Aug. 13, 2012, ACM.org, https://dl.acm.org/doi/pdf/10.1145/2342441.2342467 (Year: 2012).*
Azab et al., "Toward Smart Moving Target Defense for Linux Container Resiliency." Collaboration and Internet Computing (CIC) 2016 IEEE, 2nd International Conference on, pp. 122-130, 2016.

(Continued)

*Primary Examiner* — Zi Ye
(74) *Attorney, Agent, or Firm* — Danielson Legal LLC

(57) ABSTRACT

Methods and systems for mutating a network topology on which various containers run. The system includes a host controller to assign each of a plurality of hosts an unchanging public virtual IP address that maps to changing real IP address, a threat detection module to detect a mutation stimuli, and a management module configured to receive a mutation policy and execute the mutation policy to enact a container mutation upon the threat detection module detecting the mutation stimuli.

20 Claims, 19 Drawing Sheets

(56) References Cited

OTHER PUBLICATIONS

Jafarian et al. "OpenFlow Random Host Mutation: Transparent Moving Target Defense using Software Defined Networking." Proceedings of the first workshop on Hot topics in software defined networks, 2012, Helsinki, Finland.

"What is a Container," Docker, 2017, https://www.docker.com/what-container, Nov. 17, 2017.

* cited by examiner

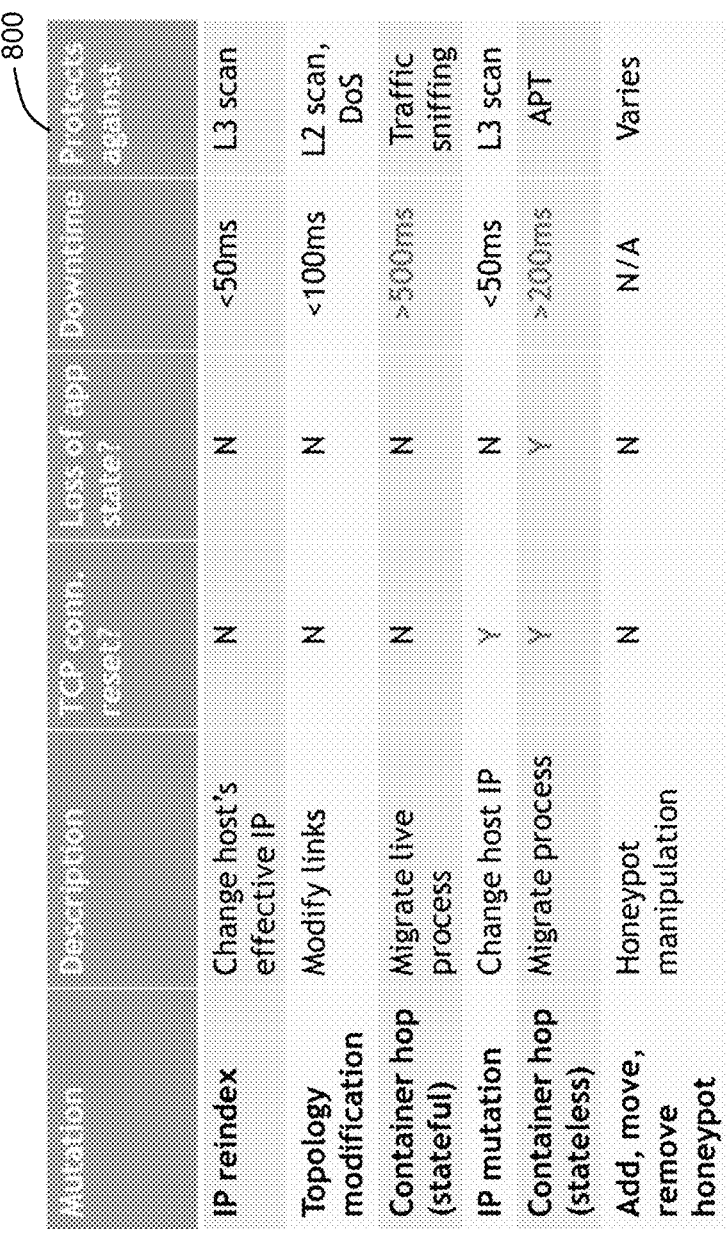

FIG. 8

| Mutation | Description | TCP conn. reset? | Loss of ICMP state? | Downtime | Protects against |
|---|---|---|---|---|---|
| IP reindex | Change host's effective IP | N | N | <50ms | L3 scan |
| Topology modification | Modify links | N | N | <100ms | L2 scan, DoS |
| Container hop (stateful) | Migrate live process | N | N | >500ms | Traffic sniffing |
| IP mutation | Change host IP | Y | N | <50ms | L3 scan |
| Container hop (stateless) | Migrate process | Y | Y | >200ms | APT |
| Add, move, remove honeypot | Honeypot manipulation | N | N | N/A | Varies |

RESILIENT POLYMORPHIC NETWORK ARCHITECTURES

CROSS REFERENCE TO RELATED APPLICATIONS

The present application claims the benefit of U.S. provisional application No. 62/424,359, filed on Nov. 18, 2016, the entire disclosure of which is incorporated by reference as if set forth in its entirety herein.

TECHNICAL FIELD

Embodiments described herein generally relate to systems, devices, and methods for responding to malicious network activity and, more particularly but not exclusively, to systems, devices, and methods for mutating a network topology on which various containers run.

BACKGROUND

The task of defending cyber networks is stacked against defenders as they are required to protect against all potential types of attacks over all attack surfaces. The attacker(s) can quickly gain the upper hand by finding just one vulnerable spot on the applied defenses.

To this end, sophisticated attackers employ a variety of techniques to gain insight about the layout of a network. For example, attackers may study a network to determine which nodes promise to be easy targets and where valuable information can be found. These surveillance and attack efforts often lead to success as evidenced by the number of successful corporate and government cyber-crime cases.

The success of these attack efforts is due in part to the static nature of networks and their defenses. Operating systems, installed applications, and their associated IP addresses seldom change between the times when they are started and shut-down. This static nature allows attackers to choose attack techniques that are tailored to the network they have studied and thus have the highest chance of success.

Although automated cyber-attack efforts such as worms and viruses are effective against a large number of targets, their successful target penetration is often hit-or-miss, and require attackers to try specific exploits until a vulnerable computer on the network is discovered. When more sophisticated attackers have chosen specific machines to compromise (e.g. in the hopes of obtaining government or company secrets), they have to perform cyber reconnaissance tasks prior to successful attacks in order to identify the environment and defense weaknesses of a network or individual computers.

An attacker can gain a large amount of helpful information by querying information that is readily and publicly available on the target network(s). Attackers may use techniques such as ping sweeping, fingerprinting, port scanning, and even social engineering. These techniques can identify, for example, IP addresses that are in use on the network, ports that are open on the hosts, services that are listening on the open ports, and the type of operating system running on the network hosts. If any of these techniques identify a vulnerability, an attacker can immediately apply an exploit. If the exploit is successful, the attacker has gained a foothold on the network.

Once the attacker establishes a presence on a network computer, they can start surveying the files on the machine and apply techniques to escalate their level of privilege (thereby gaining access to more files). At this point, the attacker is beyond the firewall that protects against outside infiltration and therefore faces fewer obstacles.

A need exists, therefore, for systems and methods for resilient polymorphic system architectures and methods that overcome the above disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for mutating a network topology on which various containers run. The method includes assigning each of a plurality of hosts on the network an unchanging public virtual IP address that maps to a changing real IP address, receiving a mutation policy; receiving a mutation stimuli, and executing the mutation policy to enact a container mutation.

In some embodiments, the mutation stimuli are generated upon detection of malicious activity.

In some embodiments, the mutation stimuli are generated according to a random, unpredictable schedule.

In some embodiments, the mutation that is enacted is defined by the received mutation policy and meets at least one constraint specified in the mutation policy and is based on the received mutation stimuli.

In some embodiments, executing the mutation policy to enact the container mutation includes changing an effective IP address of a host.

In some embodiments, executing the mutation policy to enact the container mutation includes changing an actual IP address of a host.

In some embodiments, executing the mutation policy to enact the container mutation includes changing an effective topology aspect of the network.

In some embodiments, executing the mutation policy to enact the container mutation includes restarting a container. In some embodiments, restarting the container includes restarting the container on a different host.

In some embodiments, executing the mutation policy to enact the container mutation includes capturing a state of a container on a first host, migrating the state of the container to a second host, and restarting the container on the second host.

In some embodiments, executing the mutation policy to enact the container mutation includes injecting a honeypot container into the network, wherein the honeypot container is accessible only by threat actors, and monitoring all traffic going into the honeypot container.

In some embodiments, the network is a software configurable network.

In some embodiments, the containers are virtual machines.

In some embodiments, the containers are Docker containers.

In some embodiments, executing the mutation policy to enact the container mutation includes morphing an application on a first container into a honeypot.

In some embodiments, the mutation stimuli are generated according to a prescribed schedule.

According to another aspect, embodiments relate to a system for mutating a network topology on which various containers run. The system includes a host controller configured to assign each of a plurality of hosts on the network an unchanging public virtual IP address that maps to a changing real IP address; a threat detection module configured to detect a mutation stimuli; and a management module configured to receive a mutation policy and execute the mutation policy to enact a container mutation upon the threat detection module detecting the mutation stimuli.

In some embodiments, the mutation stimuli are generated upon detection of malicious activity.

In some embodiments, the mutation stimuli are generated according to a random, unpredictable schedule.

In some embodiments, the network is a software configurable network.

In some embodiments, the containers are virtual machines.

In some embodiments, the containers are Docker containers.

In one aspect, embodiments relate to a method for responding to malicious network activity. The method includes executing an application in a first container on a first host with a first virtual address in a network; detecting a threat actor interacting with the first host; executing a copy of the application in a copy of the first container on a second host with a second virtual address in the network; capturing a state of the application in the first container; and migrating the state of the application from the first host to the second host.

In some embodiments, the method further includes recording the interactions of the threat actor with the first host after the migration of the application state.

In some embodiments, the method further includes changing the first virtual address of the first host. In some embodiments, the first virtual address is changed in accordance with a predetermined schedule. In some embodiments, the first virtual address is changed as a result of the detection of the interaction of the threat actor.

In some embodiments, capturing the state of the application includes creating an application state snapshot from the first host, and migrating the state of the application from the first host to the second host includes communicating the application state snapshot to the second host; and loading the application state snapshot on the second host.

In some embodiments, the method further includes distributing a key to a client on the network; applying a time step function to the distributed key to generate an IP address and port combination; and assigning the generated IP address and port combination to the first host.

In some embodiments, the network is a software defined network.

According to another aspect, embodiments relate to a system for responding to malicious network activity. The system includes a plurality of hosts, wherein each host is assigned a virtual address in a network; a first host of the plurality configured to execute an application in a first container on the first host; a threat detection module configured to detect a threat actor interacting with a first host of the plurality; a host controller configured to change a first virtual address of the first host to a second virtual address; and a management module configured to, upon the threat detection module detecting a threat actor interacting with the first host, capture a state of the application in the first container and migrate the state of the application from the first host to a second host on the network.

In some embodiments, the management module is further configured to record the interactions of the threat actor with the first host after the migration of the application state.

In some embodiments, the host controller changes the first virtual address in accordance with a predetermined schedule.

In some embodiments, the host controller changes the first virtual address as a result of the detection of the interaction of the threat actor.

In some embodiments, the management module captures the state of the application by creating an application state snapshot from the first host, and migrates the state of the application from the first host to the second host by communicating the application state snapshot to the second host; and loading the application state from the snapshot on the second host.

In some embodiments, the host controller is further configured to distribute a key to a client on the network; apply a time step function to the distributed key to generate an IP address and port combination; and assign the generated IP address and port combination to the first host.

In some embodiments, the network is a software defined network.

According to yet another aspect, embodiments relate to a computer readable medium containing computer-executable instructions for performing a method for responding to malicious network activity. The medium includes computer-executable instructions for executing an application in a first container on a first host with a first virtual address in a network; computer-executable instructions for detecting a threat actor interacting with the first host; computer-executable instructions for executing a copy of the application in a copy of the first container on a second host with a second virtual address in the network; computer-executable instructions for capturing a state of the application in the first container; and computer-executable instructions for migrating the state of the application from the first host to the second host.

BRIEF DESCRIPTION OF DRAWINGS

Non-limiting and non-exhaustive embodiments of the invention are described with reference to the following figures, wherein like reference numerals refer to like parts throughout the various views unless otherwise specified.

FIG. 8 depicts a table listing various types of mutations in accordance with one embodiment.

DETAILED DESCRIPTION

Figure 1:
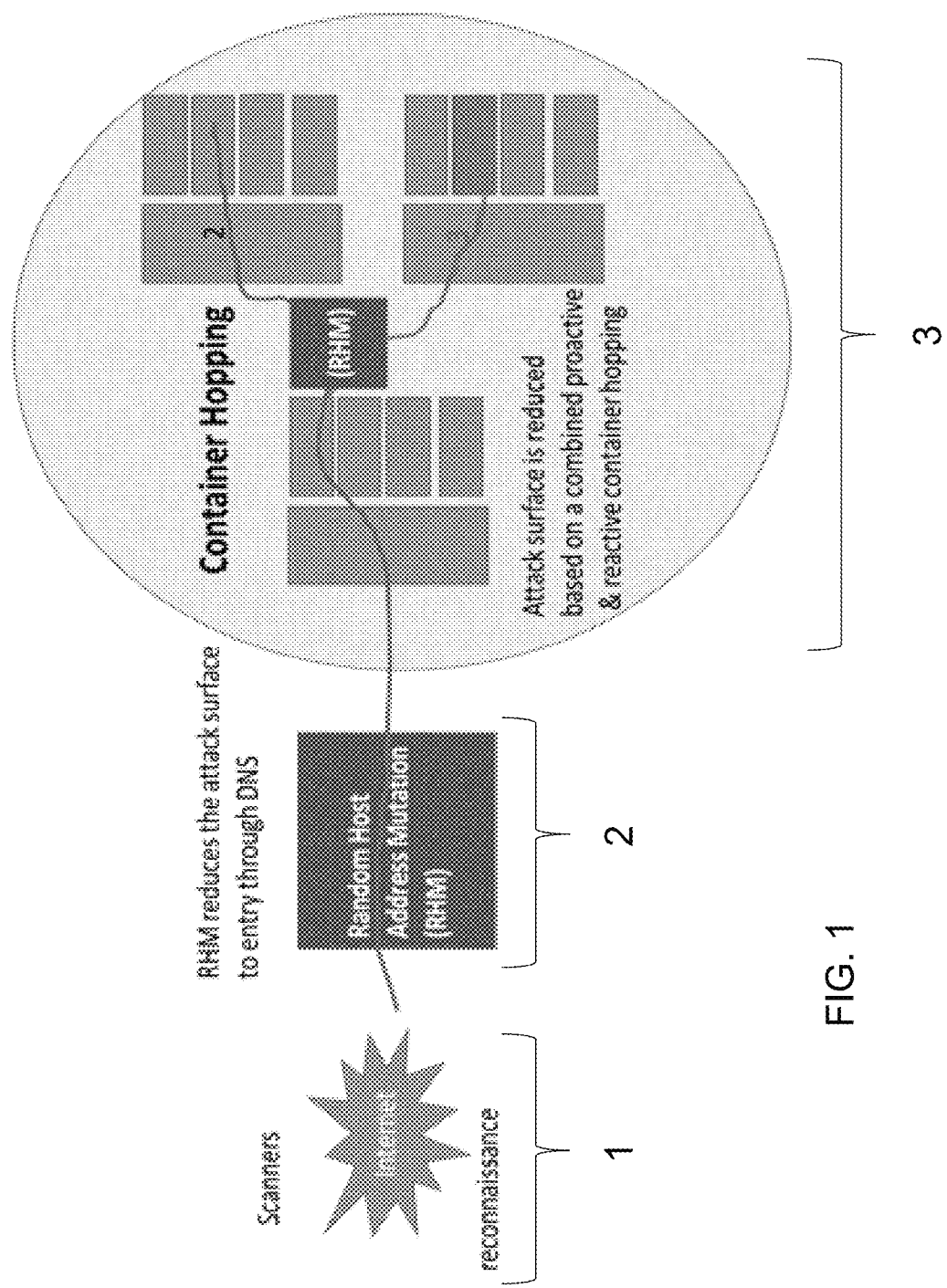
FIG. 1 illustrates multiple levels of moving targets in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of various embodiments described herein provide a novel combination of container hopping at random or scheduled intervals along with the added security to hop more frequently if the system is subject to anomalous activity. This reduces the amount of time a threat actor has to exploit an identified vulnerability. These embodiments also provide the option to convert the compromised machine to a honeypot to better understand the attacker's techniques.

The systems and methods described herein create a balance between the frequency of hopping and resource consumption while ensuring the threat actor only has access to a small observation window before the attack surface changes. Features of various embodiments described herein therefore provide dynamic moving targets to frustrate targeted attacks and to provide a reduced attack surface with only minor impacts on a system's overall performance. These embodiments provide novel capabilities to confuse and mislead potential threat actors, thereby reducing their chance of successful exploitation of the protected system.

Systems and methods described herein also provide middleware that enables the complex coordination needed to perform container hopping. This middleware may, for example, assist in reconciling container resource requirements with a current cluster state and the target address. This coordination may involve container setup, flow, port mapping randomizing placement, and load balancing.

The middleware can track individual containers, understand security hopping policies applied to said containers with respect to ports and hopping frequency, and reconcile these policies and the container needs against the overall cluster state and resource availability of the system. Moreover, hopping controllers may take into account pre-shared keys that allow clients to find their destination applications in the address space, a feature that is not provided by existing container middleware solutions.

FIG. 1 illustrates three levels 1, 2, and 3 of moving targets in accordance with one embodiment. Level 1 utilizes virtual IP addresses to prevent scanners from finding networks. Level 2 uses container hopping to ensure the application is moving through the network while successfully transitioning the application's state between moves. Level 3 leverages honeypots to detect adversary activities and occurs at two sub-levels. First, honeypots are deployed at a static location so they can be discovered by random activities. Second, if abnormal activity is detected, the targeted container will be converted to a honeypot container.

The levels of FIG. 1 provide a number of desirable features. For example, they reduce the attack surface through multiple moving target techniques. Second, they reduce the negative impact to system performance from the hopping techniques at both the container and network level. Third, they guarantee uninterrupted application service despite hopping. Fourth, they provide for a configurable frequency of scheduled container hopping as well as hopping based on indicators of abnormal behavior activity used by reactive-based approaches.

Random Host Mutation

Level 1 of FIG. 1 leverages Random Host Mutation (RHM) in three key ways. First, it provides a virtual IP address approach to prevent scanners from seeing a network of interest. Second, RHM creates random IP addresses that can be used and deployed in a secure manner to create the containers' next IP addresses and convey that information in a secure manner. Third, RHM creates virtual container IP addresses that enable IP hopping without the computational cost of creating a new container.

During RHM, moving target hosts are assigned virtual IP addresses that change randomly and/or synchronously in a distributed fashion over time. In order to prevent disruption of active connections, the IP address mutation is managed by network appliances and appears totally transparent to an end host communicating with a moving target host through the appliance. RHM employs multi-level, optimized mutation techniques that maximize uncertainty in adversary scanning by effectively using the whole available address range, while at the same time minimizing the size of routing tables and reconfiguration updates.

There may be two types of IP remapping. First, lightweight IP mapping is where a host gets a new IP address in a nearby subnet. The other type may be referred to as heavyweight IP mapping, in which case a host gets a new IP address in a distant subnet. The mutation may be scheduled or event-driven, such as when abnormal behavior is detected.

Deployment of RHM requires components to (1) handle randomization planning to determine the virtual IP address (vIP or eIP) associated with each host by considering the probes received by network hosts; and (2) the translation of the real IP addresses (rIPs) associated with each host to/from their eIPs during communication. Randomization planning may be performed by a central controller for both software configurable networks such as software-defined networks (SDN) and legacy networks. SDNs already include a central controller, while for legacy networks the controller is added to the network. The central controller determines the next eIP of network hosts by analyzing reports of scans received by network hosts.

Translation is performed by a set of distributed gateways that are located at the boundaries of physical subnets. For legacy networks, a gateway is located at these boundaries, while for SDNs the translation is performed by SDN switches of the network and according to the flow actions determined by the controller.

Figure 2:
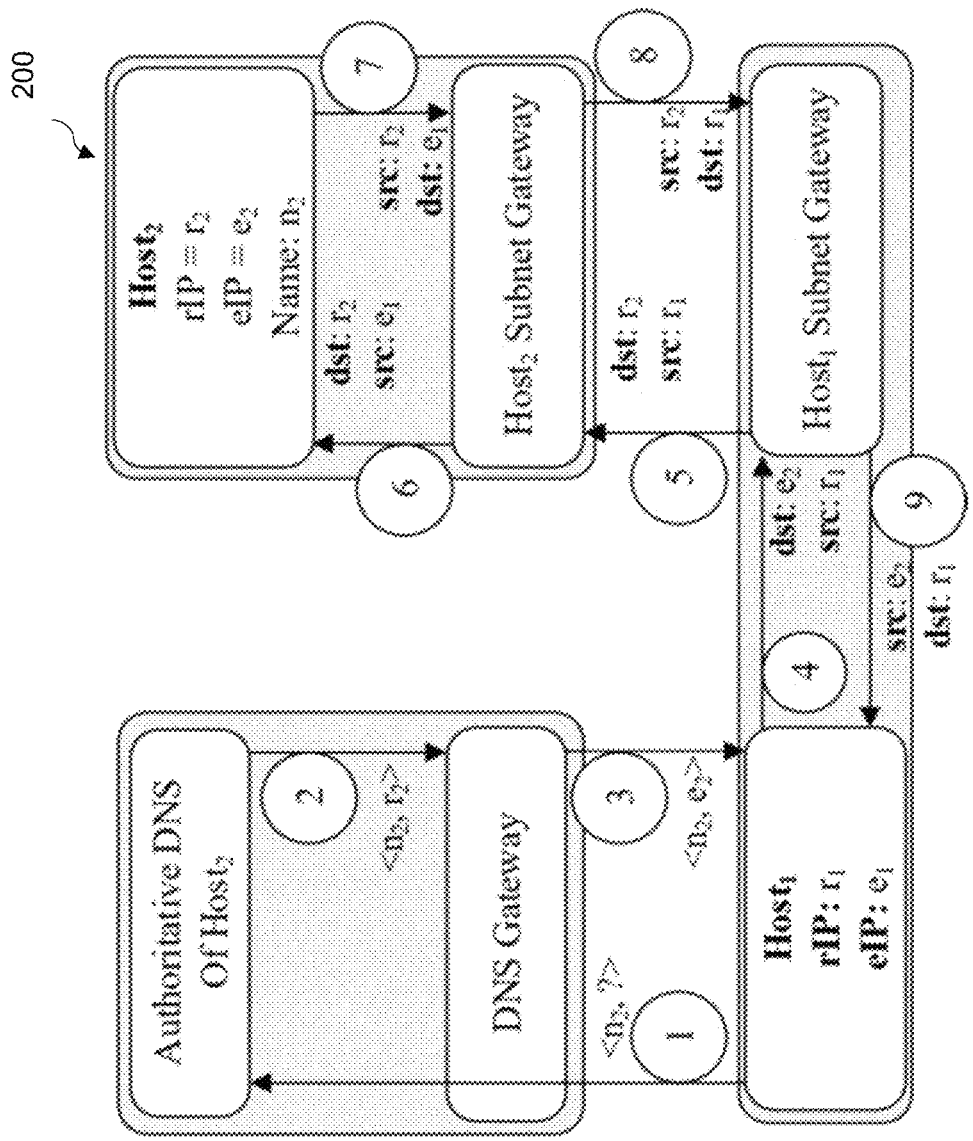
FIG. 2 illustrates the known technique of random host mutation (RHM) in accordance with one embodiment.

Since the eIP addresses of network hosts are periodically mutated, a host in the network must generally be reached via its name through DNS. FIG. 2 depicts an outline 200 of an exemplary communication protocol in a legacy network. For an SDN, the protocol is the same but translations are performed by OpenFlow switches of physical subnets.

The DNS response is intercepted by the responsible entity (i.e., gateways in legacy networks; a controller in an SDN) and the rIP of the destination host is replaced with its corresponding eIP (steps 1-3 of FIG. 2). Moreover, the Time to Live (TTL) of the DNS response is updated based on the current interval duration. As a result, clients will receive the eIP of the destination host and initiate their connections accordingly. The packets are routed to this eIP as the destination address (step 4). The eIP address is translated by the gateway into its corresponding rIP, before the packet enters the core network at step 5. Thereafter, all packets will be routed in the core network using rIP (steps 6-9)

This translation is performed for as long as communications between the source host and target host continue. More importantly, future randomizations have no effect on previously established flows. The packets of the flow will be updated and forwarded until the session is terminated (e.g., FIN for TCP) or expired (i.e., due to a long inactive time for both TCP and UDP).

In addition to its name, a host can still be reached via its rIP, but only for authorized users or non-critical hosts. In this case, the access request must be authorized by the controller. If access is granted, the flow packets are routed as in static networks. The authorization is handled based on the access control policy of the network.

Embodiments described herein provided virtual IP addresses to prevent scanners from finding host machines. To do this, embodiments described herein extend the RHM approach to provide virtual IP addresses to containers and to keep track of container hops across an enterprise.

The container hopping approach in accordance with various embodiments may use a series of virtual machines that all have the Docker daemon or another equivalent container hosting mechanism pre-installed thereon. Each machine can have containers deployed thereon that are live containers with real applications and services and honeypot containers that are used to identify and study adversaries. In the context of the present application, the term "container" may simply refer to any device or abstraction that encapsulates a running process, such as a virtual machine, Docker container, etc.

Docker Containers

The name "Docker" comes from the domain of ocean shipping. Just like containers on a cargo ship, a Docker container is a self-contained software application package that can be easily moved from operating system to operating system.

Docker's standard isolation features are based on the isolation of different namespaces within the Linux kernel. The Linux kernel's support for namespaces isolates an application's view of the operating environment, including process trees, network, and user IDs. The kernel's cgroups also provide resource isolation that can be used to limit the usage of CPU, memory, block I/O, and network communication.

At the same time, Linux chroot provides support for file system isolation. Docker also takes advantage of many other isolation tools with different tradeoffs, such as OpenVZ, systemd-nspawn, libvirt-lxc, libvirt-sandbox, and qemu/kvm to interact with the Linux kernel. These technologies, along with Docker's APIs (such as libcontainer), allow applications to be packaged with only their dependent libraries and not an entire OS image, which yields more space efficient distribution packages and faster startup times. Both startup time and package size impact how quickly an application instance can be moved to a new host as part of a hopping defense.

Container Hopping

Figure 3:
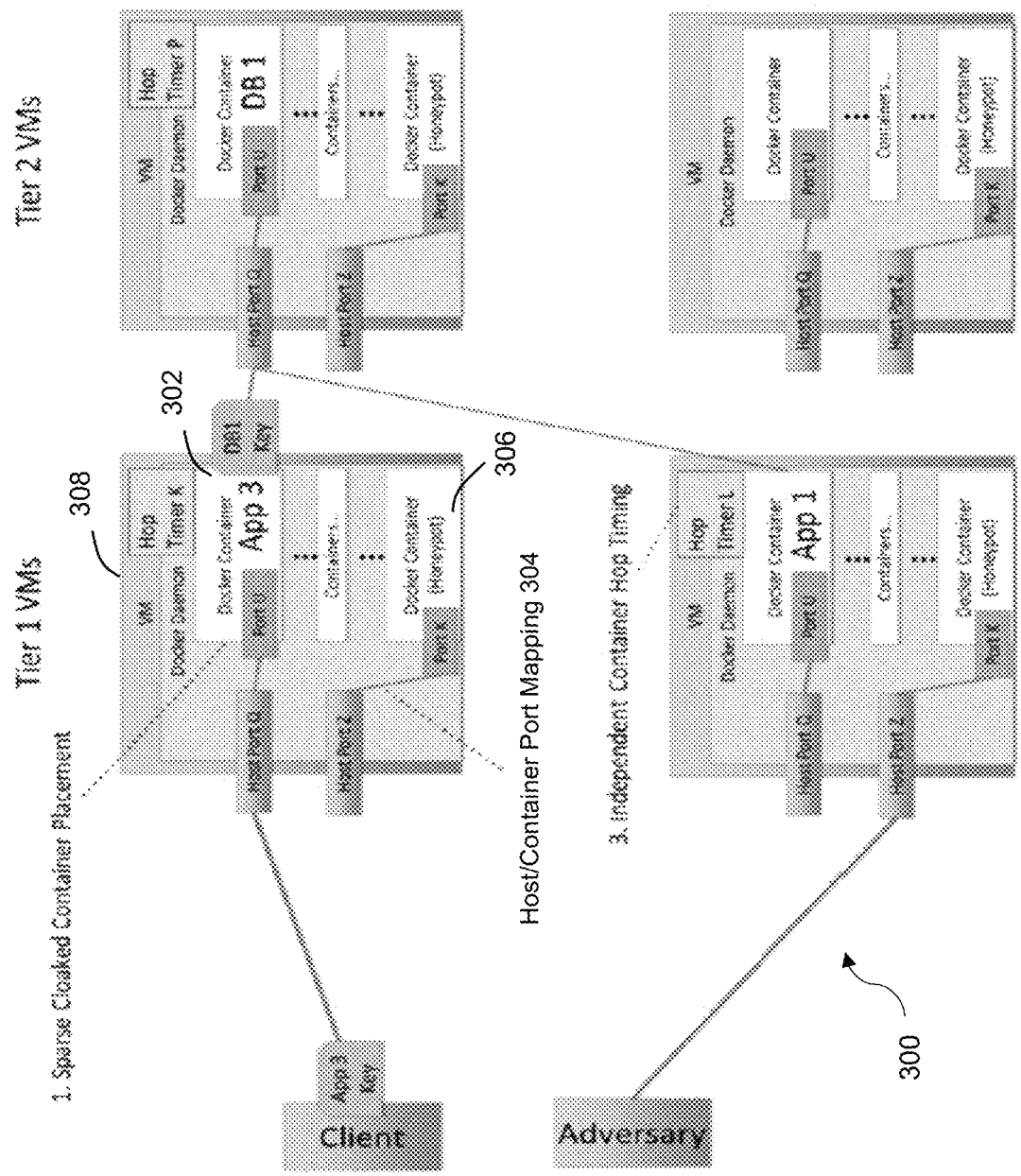
FIG. 3 illustrates an exemplary overview of docker container hopping in accordance with one embodiment.

The core idea behind container hopping is that the underlying computing infrastructure moves the application containers around on the underlying virtual machines by restarting them at periodic intervals. FIG. 3 illustrates an exemplary overview of container hopping 300.

Each time a container 302 is restarted, a new host and port mapping 304 is selected. Security can be adapted by controlling how densely live containers 302 and honeypot containers 306 are packed into VMs.

Honeypots 306 can be used or can be completely eliminated from the architecture, depending on the goals of the particular network administrators. Between any two time steps that are defined by the system security policies, the underlying security infrastructure can hop or move containers and rearrange host container port mappings to completely change the address search space that an adversary must explore.

Figure 4:
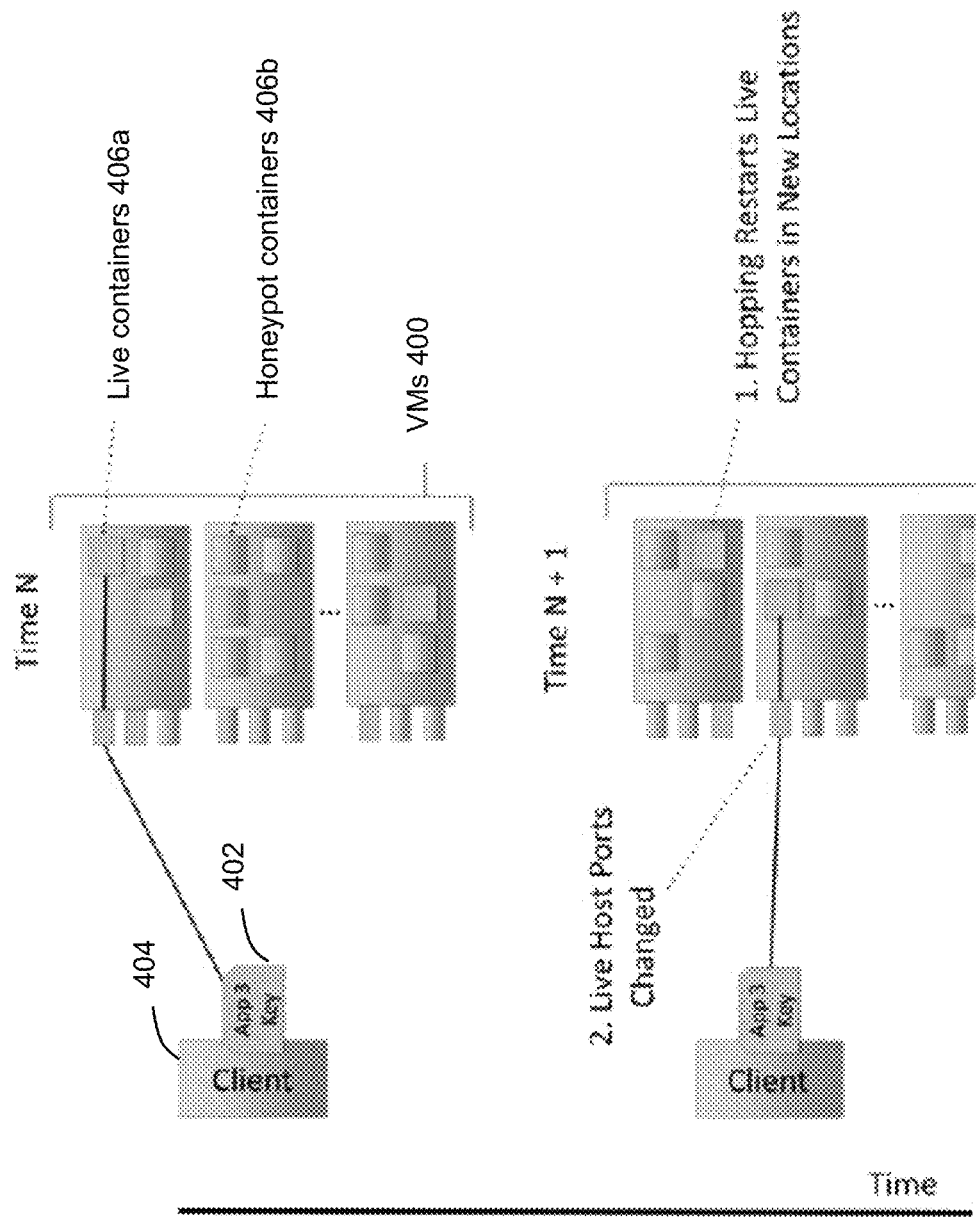
FIG. 4 illustrates key distribution in accordance with one embodiment.

To facilitate communication with the containers, keys may be pre-distributed to clients that are used to determine the correct host IP and port to communicate with at any given time and to find a target application in the continually changing address space. FIG. 4 illustrates virtual machines 400 and the distribution of keys 402 to a client 404 at time N and time N+1.

At each given time step, a function is applied to the key 402 and the current time to generate the IP and port combination where the container can be found. The host infrastructure looks into future time steps and pre-starts, but does not port map, containers that will need to be moved in a near time step. Both the container and the clients 404 share this key 402, thereby allowing clients 404 to find containers 406 as needed. The key 402 can vary per application, and may be used both for external communication with clients 404 as well as internal communication with other container services on which an application depends.

As seen in FIG. 4, each application may be subdivided into multiple containers 406 on various virtual machines 400 to support said application that may be hopped. Depending on fault tolerance and load balancing needs, clients can be provided with multiple keys in advance to allow for failover to alternate containers that are hopped independently. Clients can be load balanced both via key distribution schemes to spread load across multiple hopped containers or by having hopped containers themselves serve as load balancers for other hopped containers.

Honeypot containers may be randomly allocated to the virtual machines at configurable densities and port mappings to external host ports that are not live. Without a pre-shared key to determine hopping policies, an adversary may inadvertently access a honeypot and make themselves known.

On the other hand, validly configured clients with pre-shared keys should never attempt to communicate with a honeypot container 406b. Therefore, any communication with these containers 406b indicates that an adversary is present. Because of the complex container hopping policies and the need of an adversary to maintain persistent communication with the container over a period of time, it is very difficult for an adversary to continually discover and exploit containers without inadvertently accessing a honeypot.

Container hopping has a number of important ramifications for security. Even if an adversary finds and exploits an application without accidentally tripping a honeypot, the adversary has a limited window of time before the container will be hopped and reset to a safe state. Accordingly, this helps prevent advanced persistent threats.

Each time a container hops, it is reset to a known safe state. This reset eliminates any underlying modifications that an adversary may have made.

Additionally, each time a container is hopped, the adversary loses his or her knowledge of where the container is within the virtual IP space. This requires the adversary to rediscover the location of the application that they are trying to exploit.

Port mappings may also dynamically change. Even if an adversary finds the container in the IP space at a given time point, they may inadvertently begin communicating with a honeypot on a subsequent time step because they fail to hop ports after a port is remapped to a honeypot.

Container hopping therefore makes it more difficult for a threat actor to find vulnerable applications, particularly when they are not aware that container hopping is in place. This inability to find host machines makes it difficult to employ standard application vulnerability scanners and other tools across large networks of hosts. This increases the difficulty for an adversary to discover and gain a persistent foothold in a targeted machine or network.

At any given time, depending on the container hopping frequency and policies, an application can guarantee a minimum number of containers in a safe uncompromised state. This can be helpful in distributed consensus algorithms for security, fault tolerance, and for other purposes.

The container hopping approach in accordance with various embodiments described herein may be complementary to existing security techniques and is not intended replace them. Standard security approaches such as firewalls, mandatory access controls, host monitoring, and other approaches can still be used in conjunction with container hopping.

Container hopping impacts resource consumption by requiring increased CPU and memory utilization by non-live containers. Additionally, container hopping is accompanied by restart performance penalties. A critical question therefore is how impactful this container restarting is on the overall application quality of service (QoS). Initial research work shows that there is a manageable impact on performance that can be traded off for this enhanced security.

Moreover, hopping parameters can be optimized to maximize security while satisfying any required QoS goals and policies. In cloud environments, the cost of the increased resource consumption resulting from the hopping can be directly measured and reported for each hopping policy applied to an application.

A challenge to overcome is the need for complex resource optimization techniques to understand how to move containers so that the container hopping can be done efficiently and without disruption to an application's QoS. For example, before a container hops, the middleware must find an appropriate receiving host with sufficient resources. Then, the middleware must determine when to start additional shadow containers that can be swapped over to in order to complete a hop with minimal disruption to the application's QoS. The middleware must be able to account for these shadow containers and hopping epochs that coincide across containers while still ensuring resource availability.

An additional area of complexity is the need to reconcile container resource requirements with the current cluster state with the target address identified by the pre-shared key at any given point in time. For example, if a container is about to be hopped, and the pre-shared key dictates that the container be placed on a particular host, the underlying middleware must find a way to accommodate that container on that host or else clients will not be able to find that container.

To address this need, the middleware in accordance with various embodiments, which may be based on Docker, automatically hops containers between hosts, manages complex resource constraints, and attaches hopping policies to containers. This middleware may ensure that container-hopping policies and key sets can be honored before a new container and hopping policy are admitted.

To determine if anomalous behavior is occurring on a network, various embodiments may also implement the Robust Software Modeling Tool (RSMT). RSMT is an effort to extract application-level models of program behavior during unit and integration testing. These models are compared to behavior observed during deployment to detect when untested and therefore potentially unsafe behaviors emerge in running software.

RSMT uses compile-time models to enable the detection of attacks against a deployed software system and offers resilience against such attacks when they occur. RSMT includes a dynamic system monitor that tracks both the model and the state of a running system to which the model is bound, thereby enabling it to both detect errors before they cause damage and potentially recover from them when they do occur.

In addition to programmer-specified models, RSMT has demonstrated the construction of automatic characterizations of software behavior by observing it during unit and integration testing. RSMT can then compare these models to emergent behavior at runtime to determine whether the system has deviated from expected behavior.

RSMT allows for models of normal behavior to be built by monitoring the system during runtime and then leveraging the designed models to enhance system security at runtime. RSMT is relevant to the proposed effort because it makes extensive use of bytecode instrumentation to not only monitor system behavior but also to enforce the application policy.

RSMT uses concepts pulled from static analysis, manual modeling of software, machine learning, and self-adaptive system architectures to develop models to learn and detect what is normal system behavior. This achieves a number of advantages.

For example, while RSMT does perform some degree of static analysis, its primary characterization of program behavior is derived from monitoring software as it executes when driven by real-world parameters. This gives RSMT a more realistic view into the behavior of the software than techniques such as symbolic execution.

It also allows RSMT to analyze software that would be impossible to inspect accurately using a pure static analysis. For example, frameworks like SPRING utilize configuration files to wire applications together. Static analysis of a SPRING application would likely be inaccurate because the configuration of the system would not actually be known until runtime. Additionally, software that uses evolutionary programming paradigms like Aspect Oriented Programming (AOP) have an inherent runtime flavor that simply cannot be captured by static analysis.

As another example, and unlike manual modeling approaches, RSMT does not require a rigorous model of all system behaviors. Programmers can, at their discretion, provide hints to RSMT about the nature of data being manipulated and assumptions about that data. These optional hints are provided in the form of programmer-provided annotations bound to source code. It is important to note that, even in the absence of these features in bytecode, RSMT will nonetheless automatically produce its own internal models of system behavior.

The programmer annotations provide additional opportunity for feature extraction and verification when building these models. Therefore, RSMT has significantly less overhead than traditional manual modeling approaches (in which an accurate model must not only be created but maintained whenever code changes).

In summary, RSMT provides a way to learn and validate normal behavior at runtime and leverage this knowledge to monitor normal behavior (e.g., at the container level). This includes instrumentation support for: (1) time spent in the container; and (2) course grained (method) control flow to quickly validate this approach.

Figure 5:
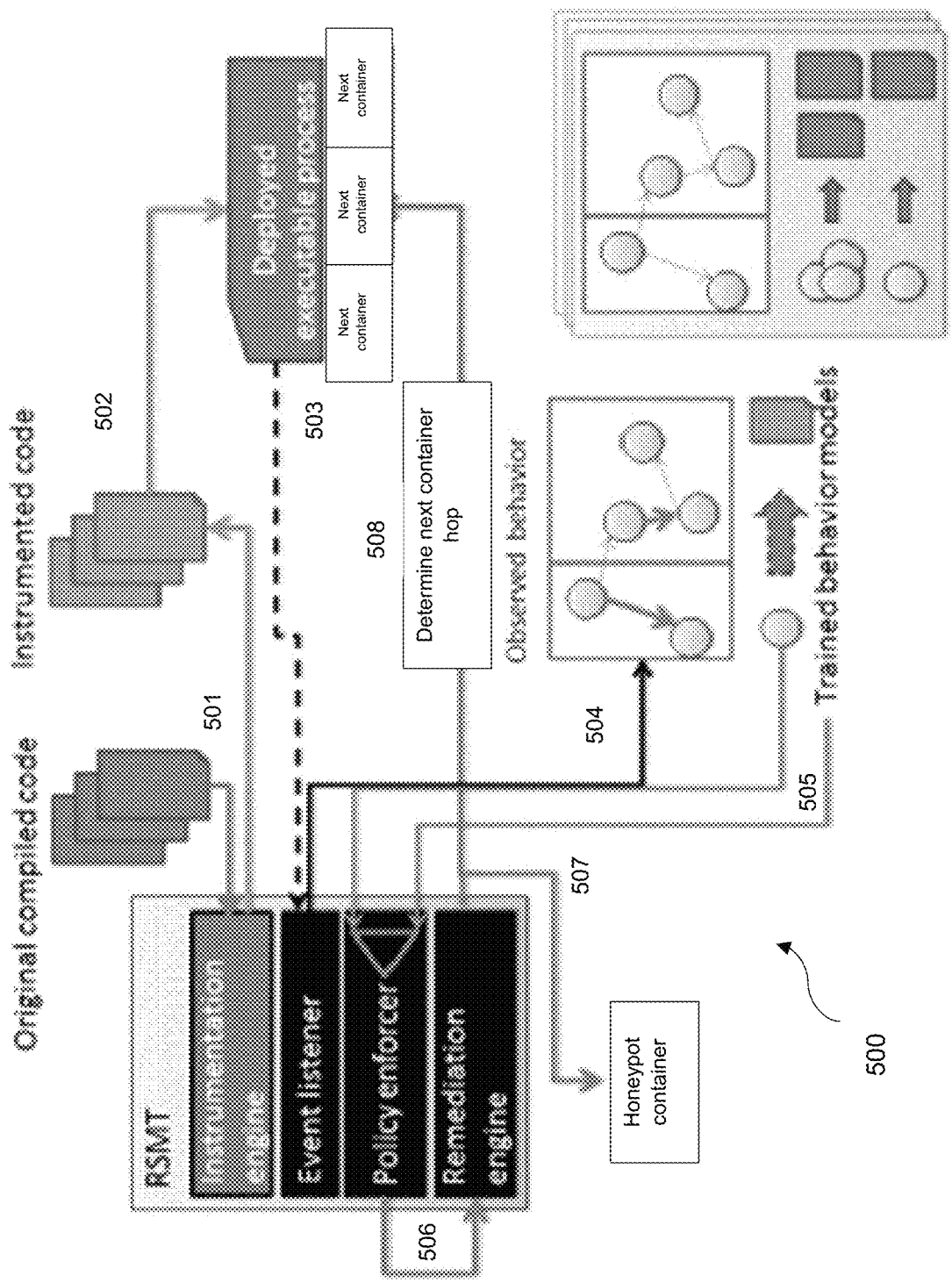
FIG. 5 illustrates the architecture of the Robust Software Modeling Tool (RSMT) in accordance with one embodiment.

FIG. 5 illustrates the architecture 500 of RSMT in accordance with one embodiment. At event 501, the instrumented code is executed within a deployment process. Whereas previously the code was assumed to have been used by trusted individuals, now the code is assumed to be used by potentially untrusted individuals. During execution at event 502, event notifications are pushed to the event listener, which resides in a separate and possibly remote process.

The event notifications are received by an event listener at event 503. The event listener constructs periodic snapshot models of the observed program behavior. At event 504, an RSMT alert engine periodically compares the observed behavior trace to the models of exploit behavior.

At event 505, if the RSMT alert engine detects an alignment between an exploit behavior and the actual system behavior, it generates a human readable report and issues alerts to the appropriate personnel. The RSMT remediation engine may be activated at event 506 to intervene in the process for which the model violation occurred (e.g., if an intervention is specified in the remediation policy).

At event 507, the system may initiate a remediation step by hopping to honeypot, increase the frequency of hopping, and swap out the container where the abnormal behavior was detected. A network administrator may also be notified of the detected abnormal network behavior. In step 508, the architecture may determine the next container that will continue processing the thread.

Figure 6:
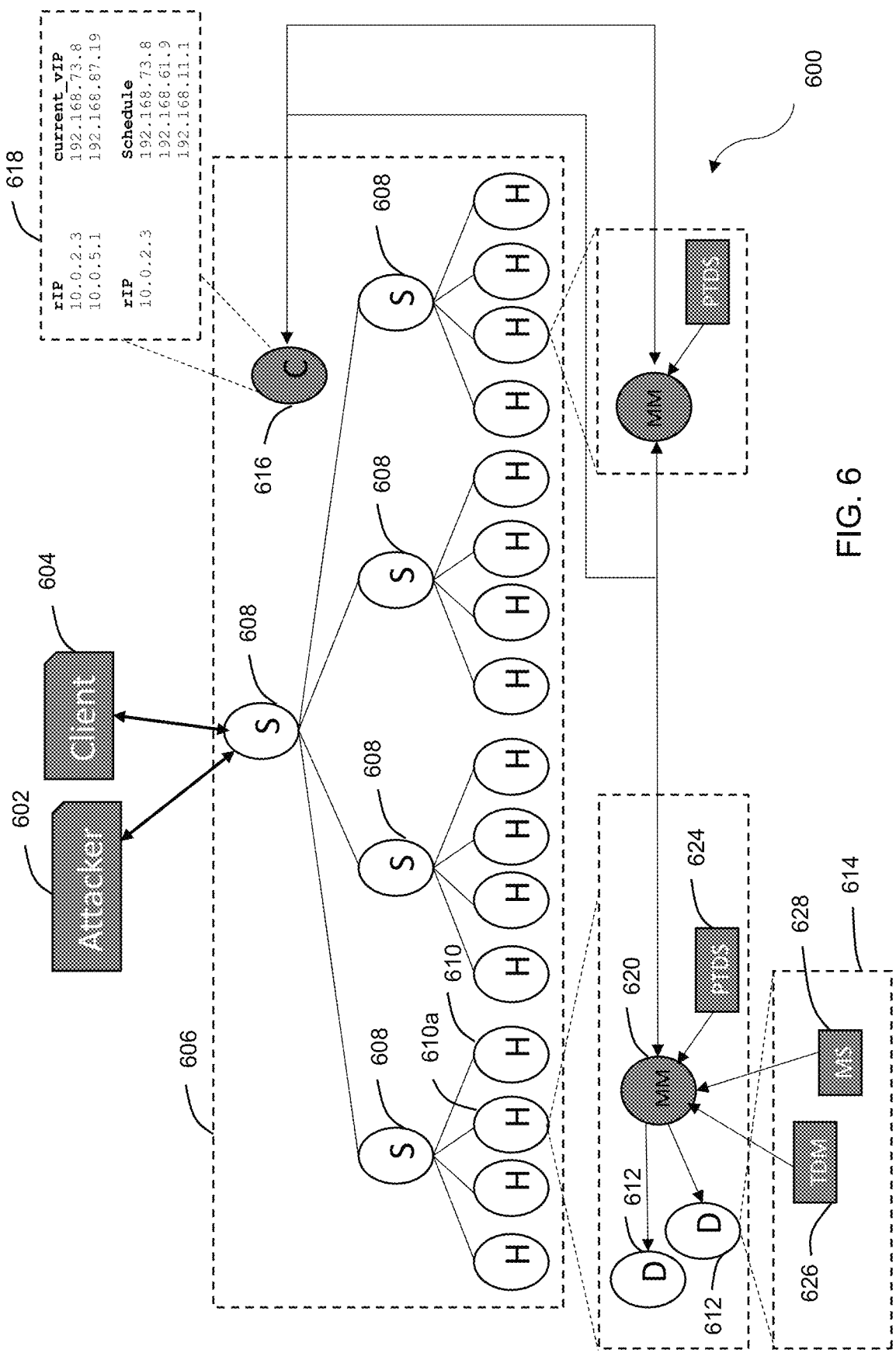
FIG. 6 illustrates a system for mutating a network topology on which various containers run.

FIG. 6 illustrates a system 600 for mutating a network topology on which various containers run in accordance with one embodiment. The system 600 shows an attacker or a threat actor 602 and a client 604 interacting with a network 606. The threat actor 602 may be a user that attempts to surveil the network, gather reconnaissance metrics, and/or interrupt services or applications. The client 604 may be a "good" or otherwise benign user who interacts with functionality provided by a service or application. The network 606 may be a software defined network (SDN) that, for example, simulates a DoD network.

The network 606 may include a plurality of switches 608, hosts 610, and links between these components. The hosts 610 are illustrated as nodes that represent computing devices connected to the network 606. Each host 610 may include one or more containers 612 that may each execute a service or application 614 (hereinafter "application").

The network 606 may also include a host controller 616. The host controller 616 may perform a variety of functions such as, but not limited to, maintaining mappings between rIPs and vIPs, managing routing issues within the network 606, and generating an optimal hopping schedule. For example, FIG. 6 shows rIPs along with addresses in connection with a hopping schedule 618.

In the context of the present application, an application 614 may refer to a process that exposes functionality via network input/output (IO). For example, a process may be executed to get the current time by doing an HTTP GET to localhost:8080/time.

FIG. 6 specifically shows host 610a with management module 620 in communication with a plurality of containers 612 that run on the host 610. The containers 620 may be docker containers, and may contain or otherwise execute one or more applications 614.

There may be one management module 620 per host. The management module 220 on each host 610 may execute the mutation policy to manage the starting, stopping, and migrating of container(s) that run on the respective host 610. Accordingly, the management module 620 of each host may be in communication with the host controller 616 to coordinate and synchronize migrations. The host 610a may also include a platform threat detection shim (PTDS) 624.

The application 614 executed by the container 612 may include a threat detection module 626 and a middleware migration shim 628. The threat detection module 626 may gather metrics that indicate that a cyber attack is in progress. Through the appropriate instrumentation, the threat detection module 626 may run inside the application 614. Alternatively, the threat detection module 626 may run as a standalone process on the host 610. In this configuration, the threat detection module 626 may examine system calls using a kernel module or LD_PRELOAD.

The middleware migration shim 628 is implemented as an application-agnostic API for snapshotting and migrating the state from one process to another. For example, this may include, but is not limited to, byte [ ] saveState( ) and void restorestate) byte [ ] serializedState).

Figure 7A:
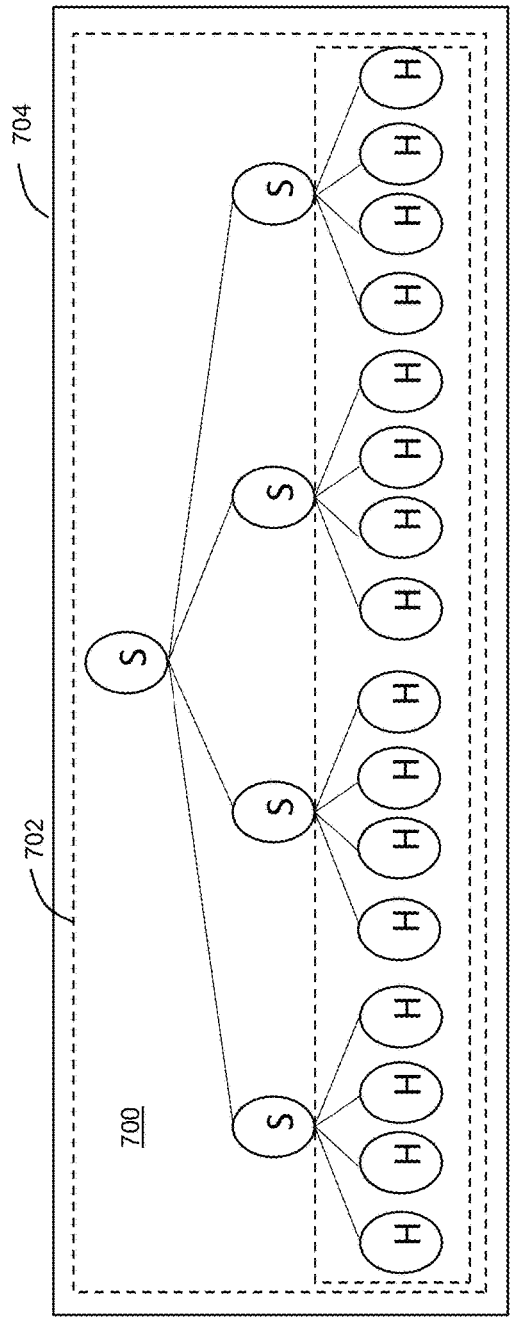
FIGS. 7A-M depict a method of mutating a network topology on which various containers run in accordance with one embodiment.

FIGS. 7A-M illustrate an exemplary operation of a system 700 (which may be similar to system 600 of FIG. 6) for mutating a network topology on which various containers run in accordance with one embodiment. FIG. 7A illustrates components of the system 700 at time T=0 at which point the mininet software-defined network 702 initializes. The SDN 702 may simulate a DoD network connected to the Internet, and may be on a demo machine 704, for example.

In FIG. 7A, the hosts are visible outside of the network 702 via some unchanging rIP. Hosts are visible inside the network via some randomly changing vIP.

Figure 7B:
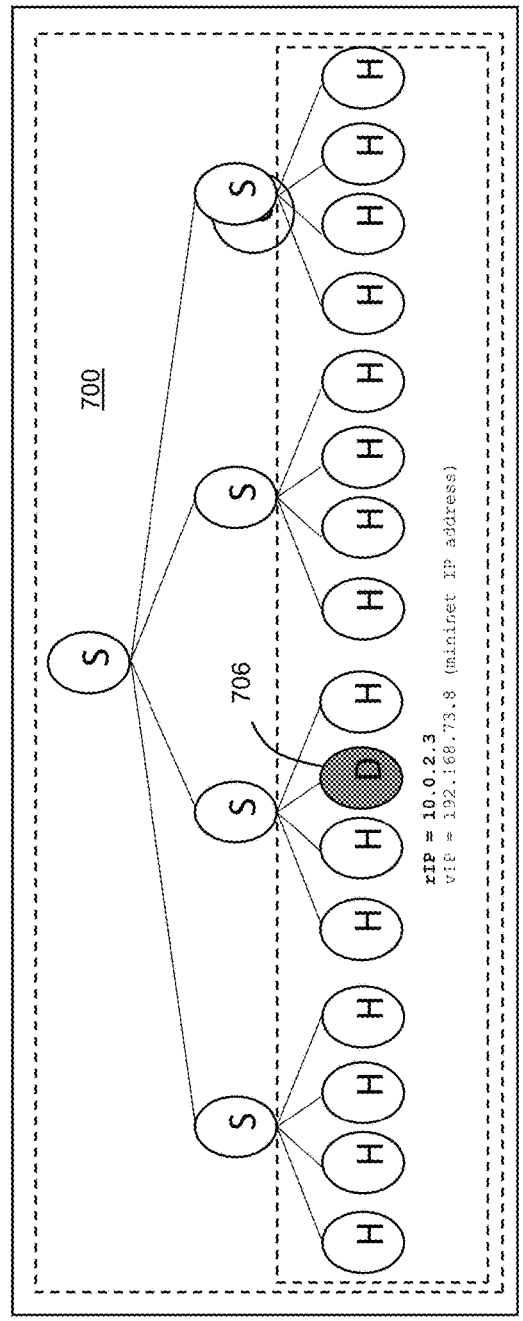

FIG. 7B shows the system 700 at T=1. At T=1, docker container 706 that hosts a service is started. The host executing the container 706 has an rIP=10.0.2.3 and a vIP=192.168.73.8 (which is the mininet IP address).

Figure 7C:
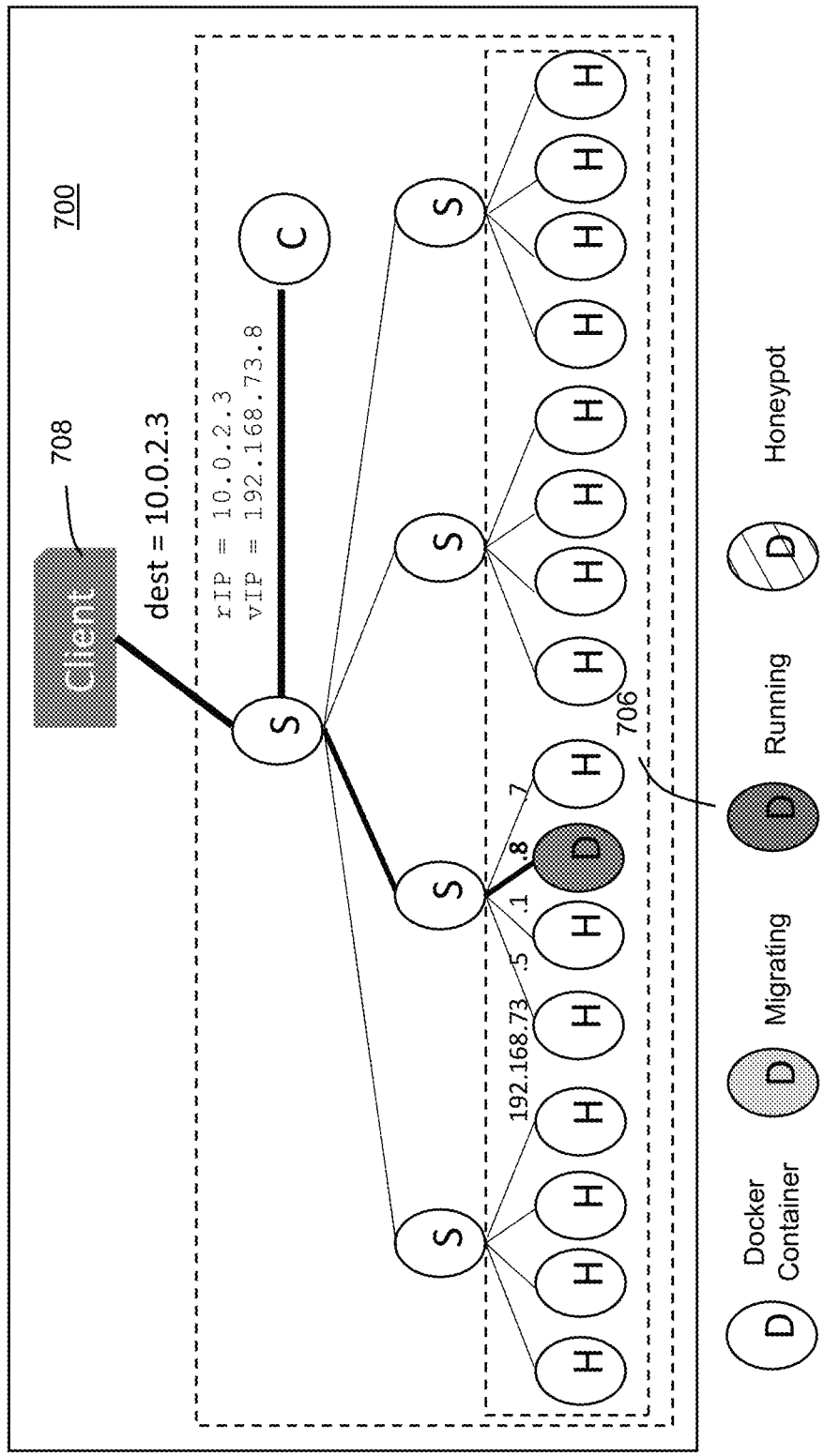

FIG. 7C illustrates the system 700 at T=2. At T=2, the client 708 interacts with the service at rIP=10.0.2.3.

Figure 7D:
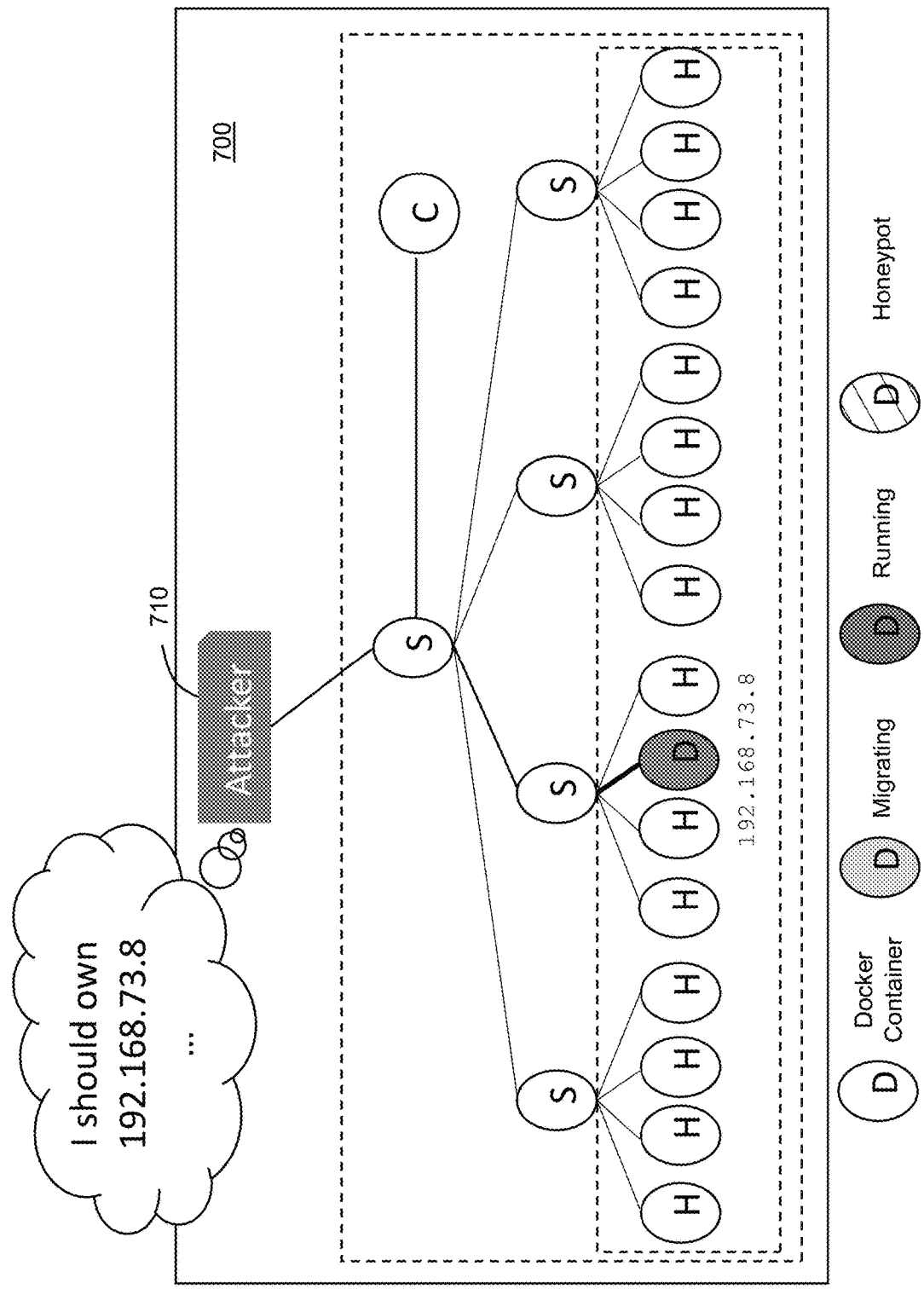

FIG. 7D illustrates the system 700 at T=3. At T=3, the attacker or threat actor 710 may scan the network (e.g., to gather reconnaissance metrics). At this point, the attacker 710 is under the impression they own or are otherwise accessing vIP=192.168.73.8.

Figure 7E:
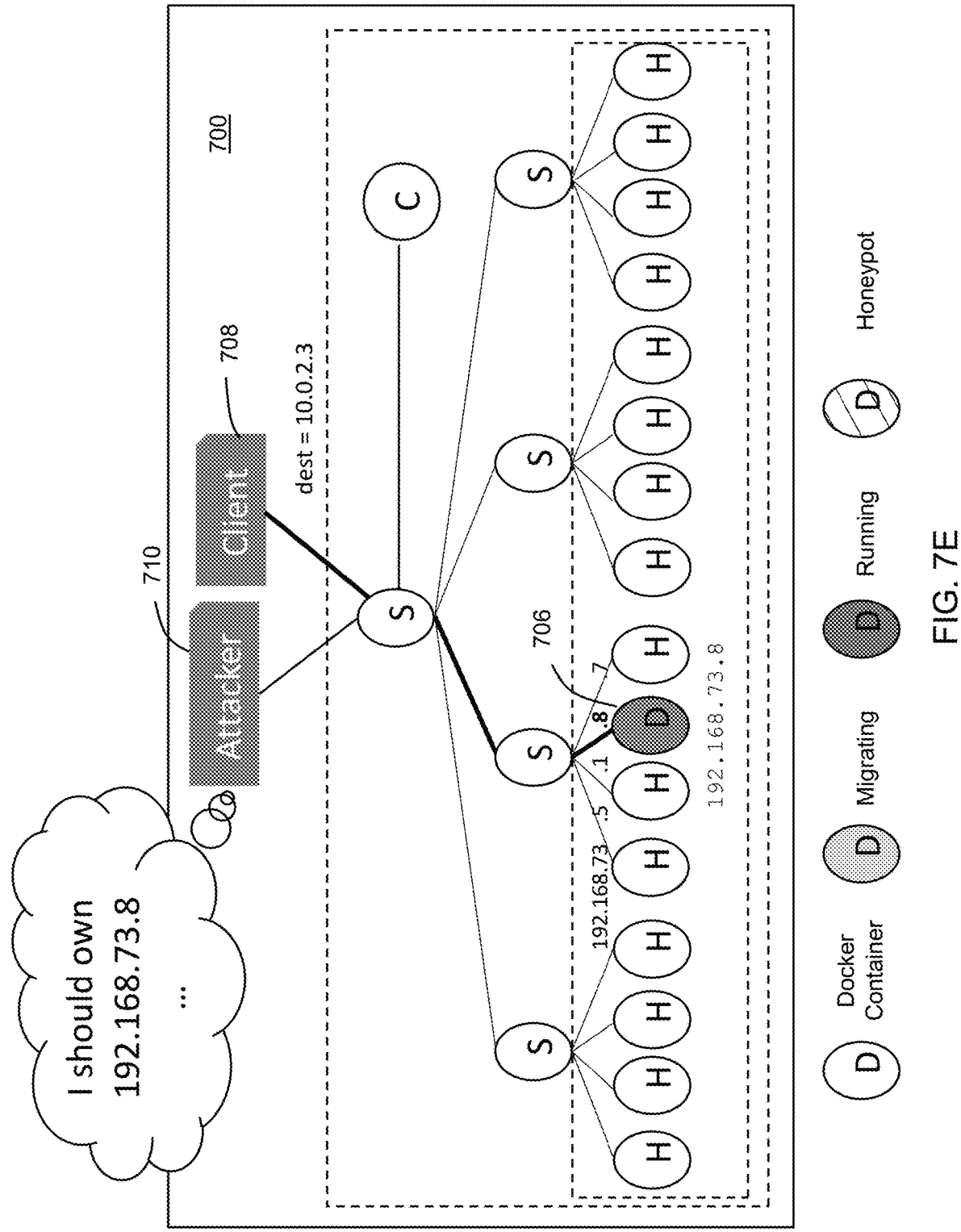

FIG. 7E illustrates the system 700 at T=4. At T=4 both the attacker 710 and the client 708 have accessed the host 706.

Figure 7F:
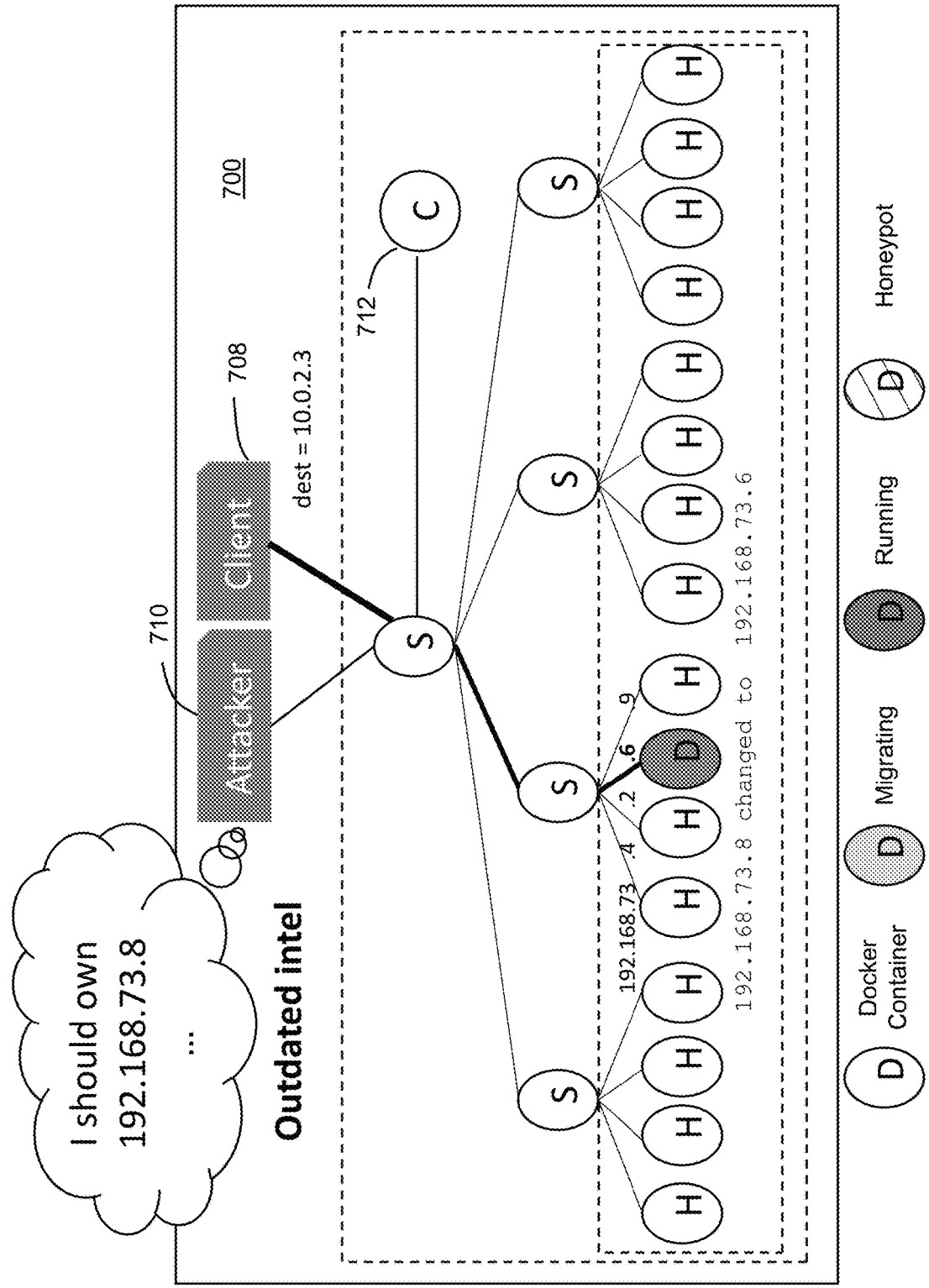

FIG. 7F illustrates the system 700 at T=5. T=5 represents the random mutation, in which the vIP of the host is changed from 192.168.73.8 to 192.168.73.6. Accordingly, attacker 710 is under the mistaken belief that he or she still owns 192.168.73.8. While some packets may be lost, any negative consequences are mitigated due to TCP. Additionally, the controller 712 keeps the mapping for 10.0.2.3 up to date.

Figure 7G:
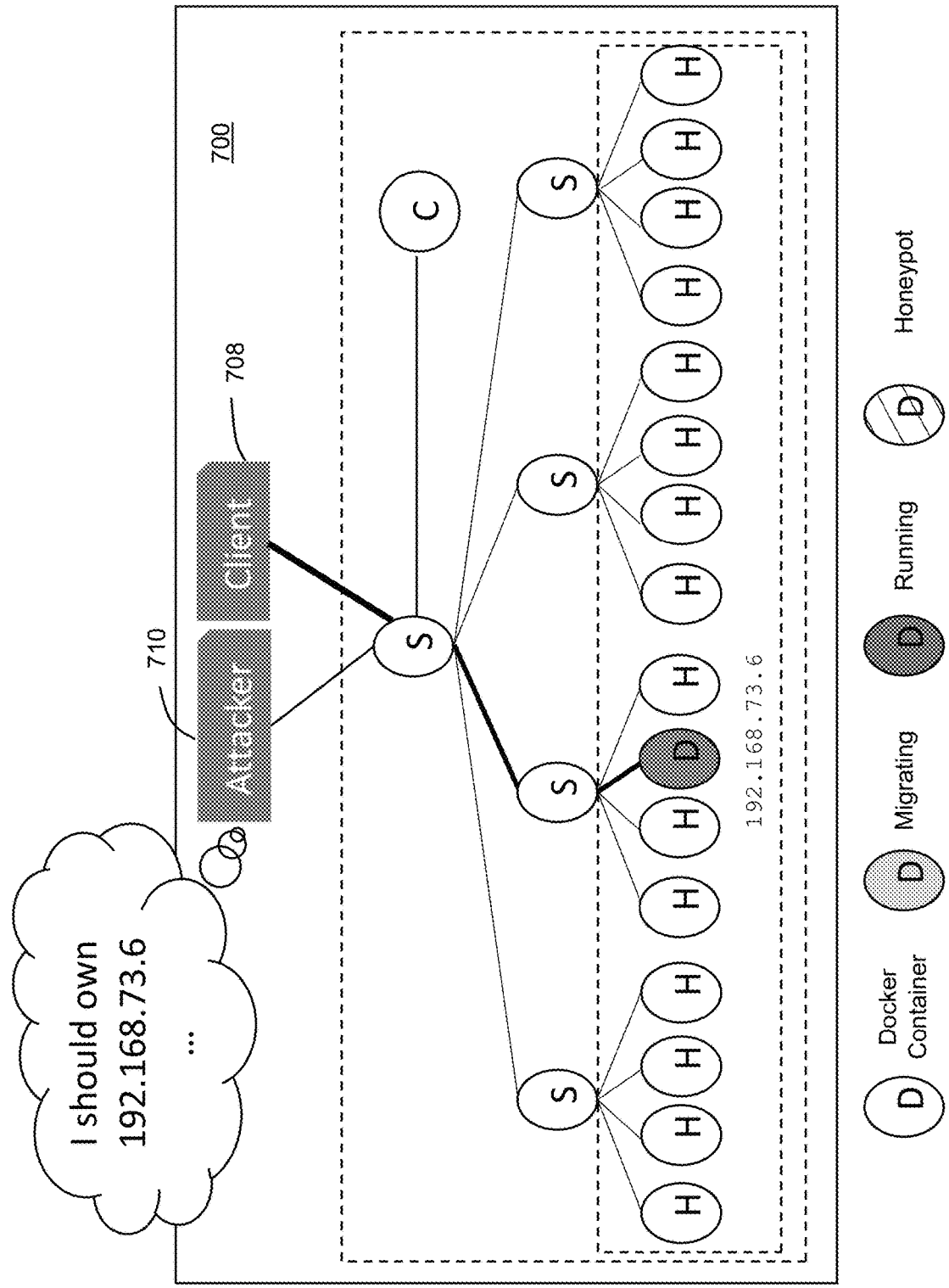

FIG. 7G illustrates the system 700 at time T=6. At T=6, the attacker 710 rescans the network and now owns vIP=192.168.73.6.

Figure 7H:
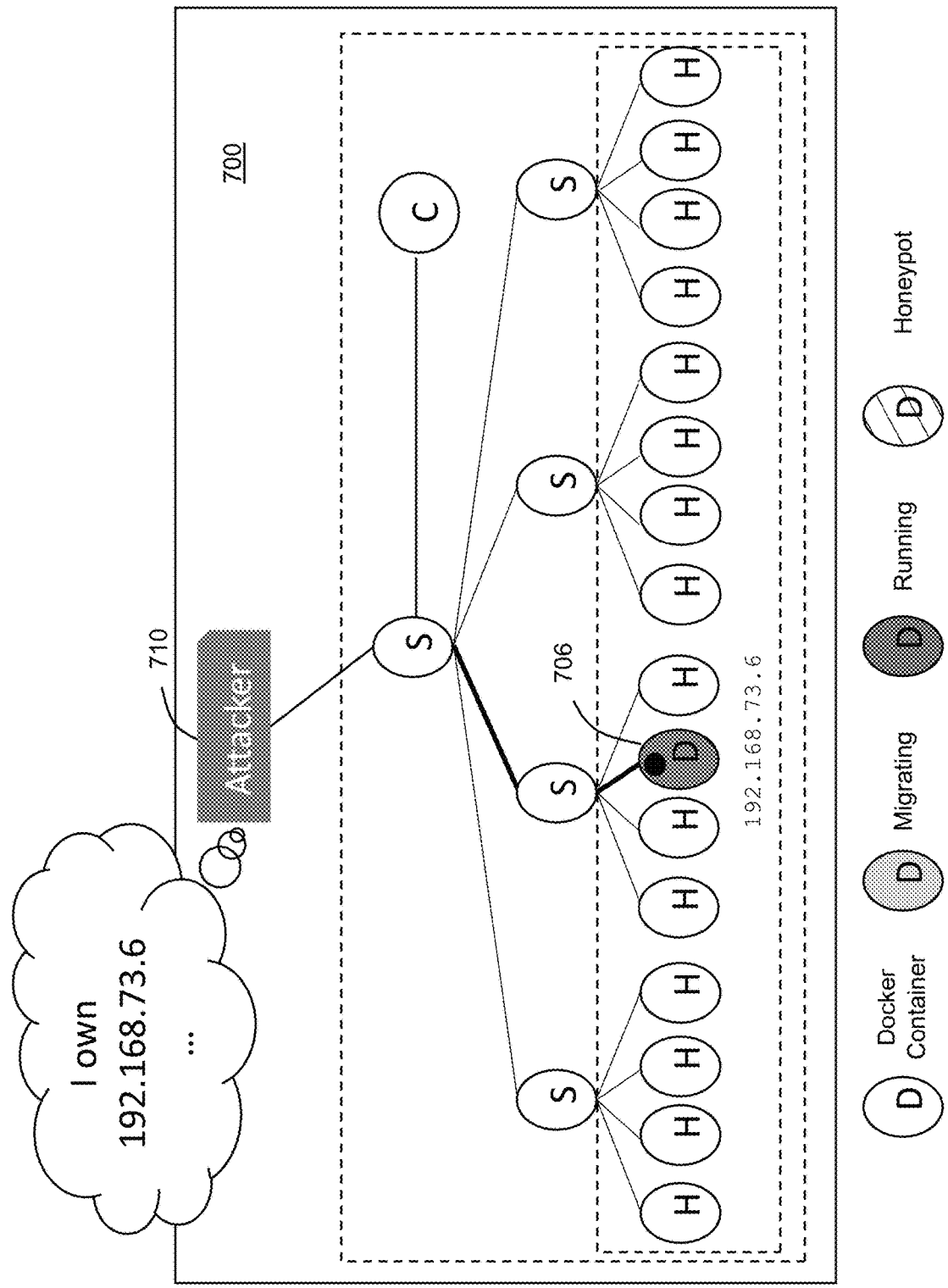

FIG. 7H illustrates the system 700 at time T=7. At T=7, the attacker 710 has compromised the host 706 at vIP=192.168.73.6.

Figure 7I:
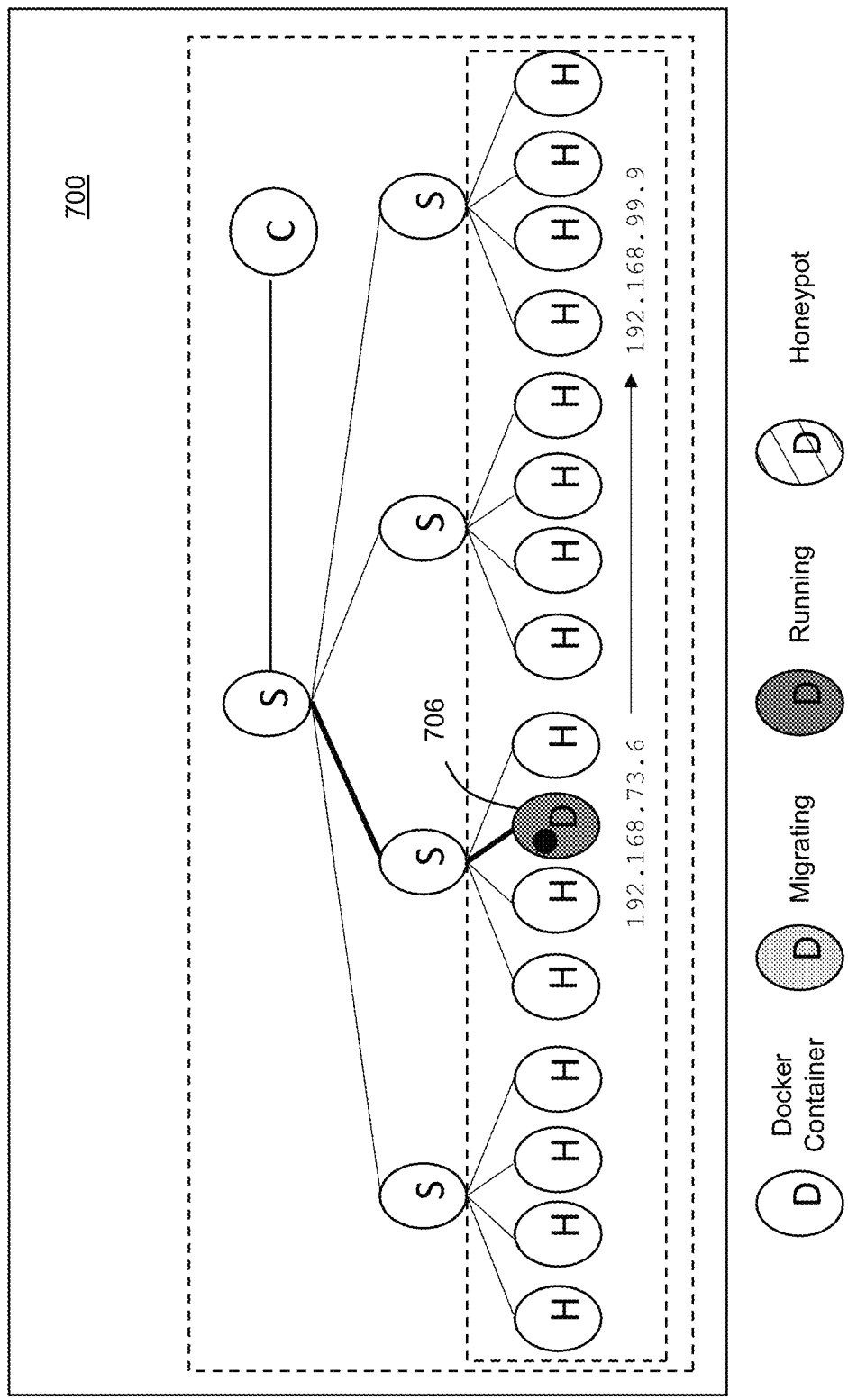

FIG. 7I illustrates the system 700 at time T=8. T=8 represents the container hop for the host 706. Specifically, the service is moved from vIP=192.168.73.6 to vIP=192.168.99.9.

Figure 7J:
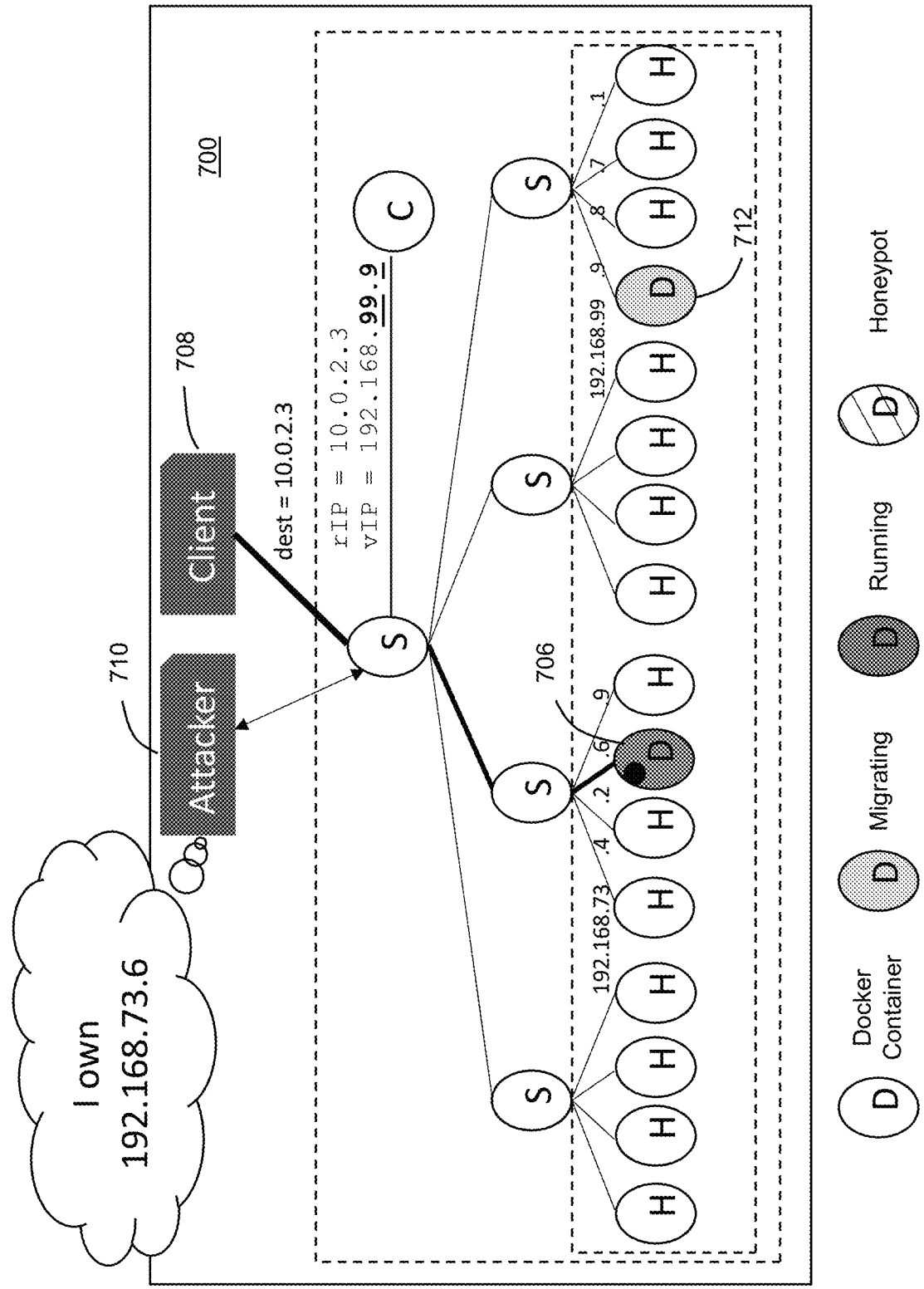

FIG. 7J illustrates the system 700 at time T=8.1. At T=8.1, a new container is started on host 712 with vIP=192.168.99.9.

Figure 7K:
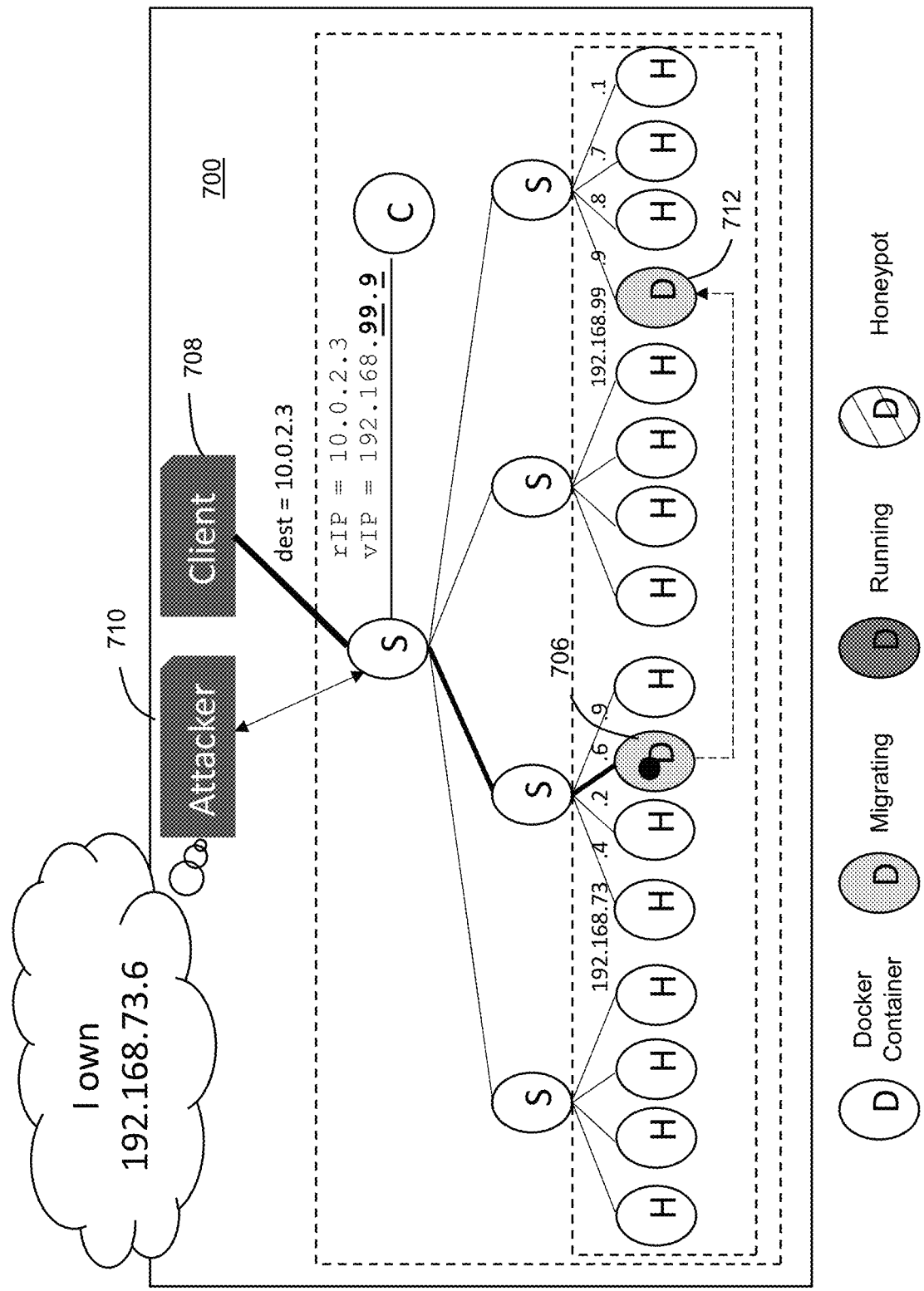

FIG. 7K illustrates the system 700 at time T=8.2. At T=8.2, the application state is moved from host 706 to host 712. Additionally, any required middleware (e.g., from the management shim) may help migrate the state smoothly so as to not drop sessions.

Figure 7L:
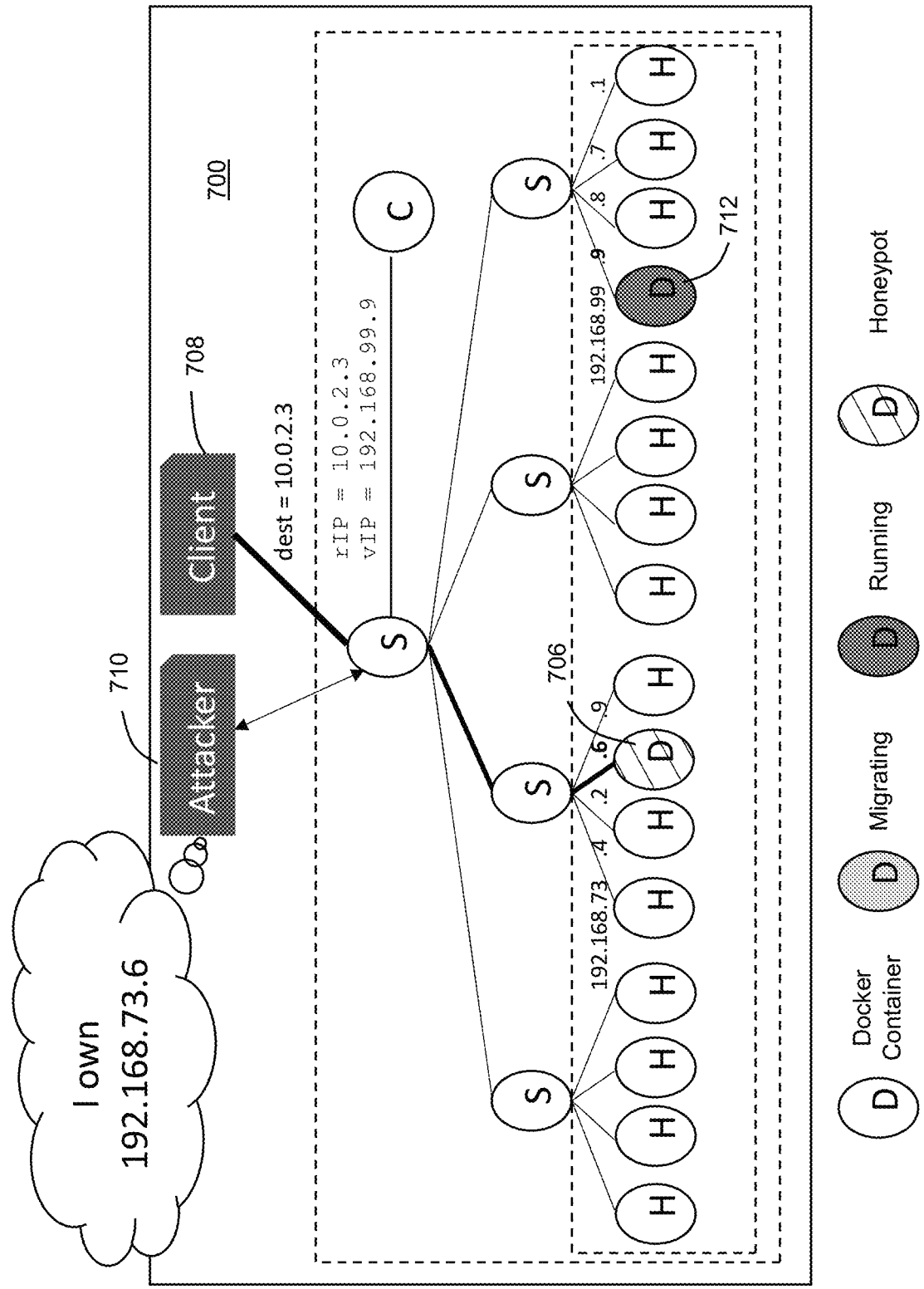

FIG. 7L illustrates the system 700 at time T=8.3. At T=8.3, the host 706 is switched to a honeypot mode. Host 712 now includes a container that is running the service that was previously run on host 706. Accordingly, the honeypot on host 706 now monitors the attacker's behavior. The attacker 710 is unaware of the change and is therefore misled to believe he is still interacting with the service. In some embodiments, the honeypot may be implemented by morphing the container from the application to a honeypot in place and without any migration.

Figure 7M:
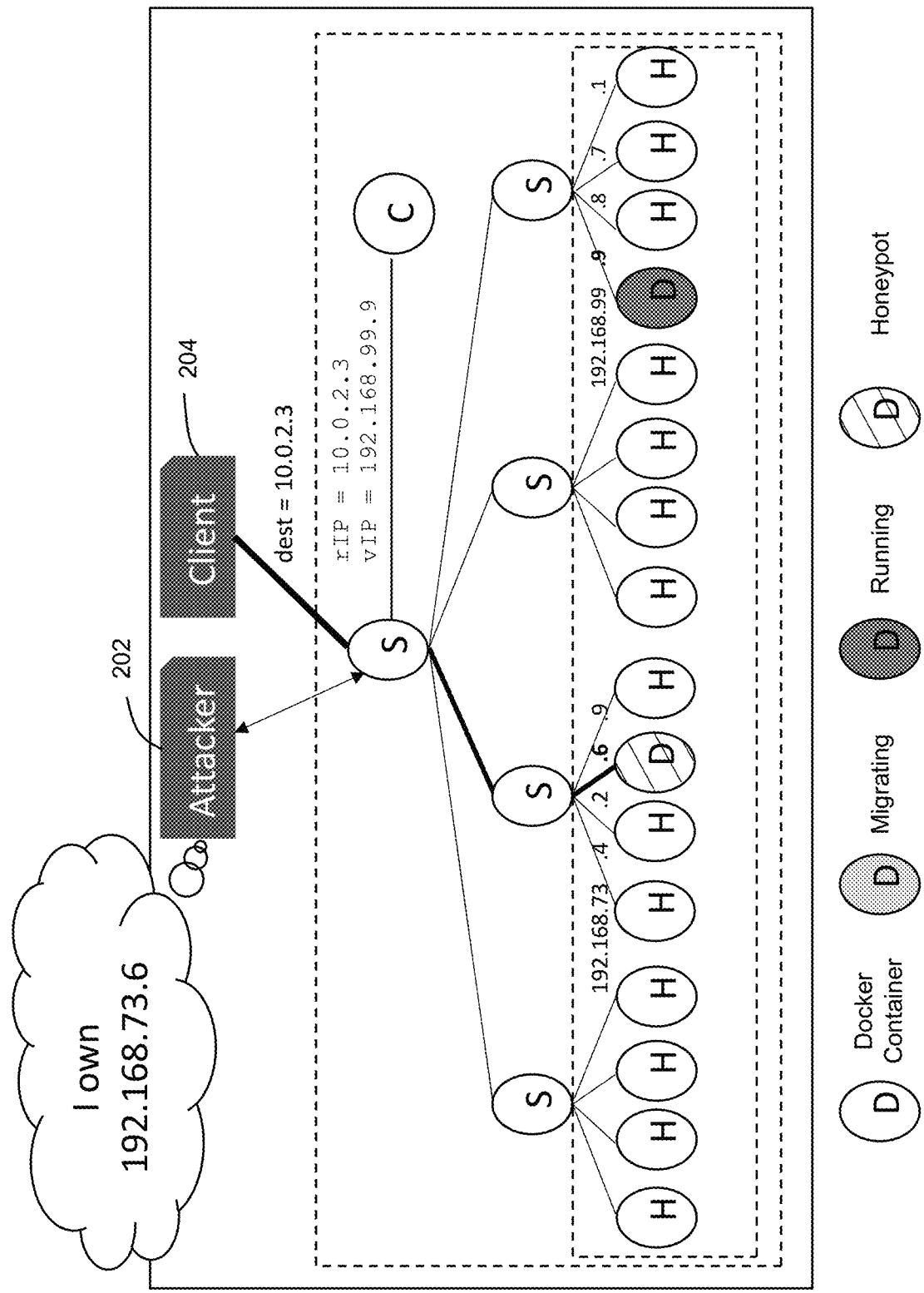

FIG. 7M illustrates the system 700 at time T=8.4. At this point, the attacker's activities may be logged, restricted, and/or used as counterintelligence. Due to the hop, the client(s) may see a brief glitch in server response time. However, the clients 708 are otherwise unaffected by the hop.

When just one container is moved, even at frequencies as high as one hop per second, there may be little impact on the throughput of the cluster. When half of the containers are moved, the throughput may still be up to 70% of the original cluster, with only a 30% increase in response time.

When almost all containers are moved, throughput may still be around 50% of the original cluster, with a large increase in response time, which in some cases may double.

When the hopping interval is large (e.g., greater than 20 minutes), the system will experience little to no change in throughput. The reason is the fast startup and tear down of the Docker containers, which is just 1-3 seconds for each container. This allows the cluster to return to its original state quickly after a hop.

If a server is under frequent attack, 10% of containers can be hopped at a 10 second frequency and result in a 5% or less degradation in performance. In summary, achieving the correct balance between the frequency of hopping and the number of containers used can provide significant security benefits with minor impact on QoS.

FIG. 8 depicts a table 800 listing various types of mutations that may be undergone in accordance with various embodiments. Any of these types of mutations, taken singularly or in some combination, may be executed at random or in accordance with a prescribed schedule. In some embodiments, a defined mutation policy may change a host's effective IP address. For example, assume there is an incoming packet that is addressed to 10.1.0.1 (vIP) that currently maps to 10.0.0.9 (rIP). In this type of mutation, the packet is modified in-flight by the SDN data plane (assuming deployment on an SDN) such that it is now addressed to 10.9.0.3. Note that this is not the rIP. The data plane may be configured such that traffic addressed to 10.9.0.3 safely reaches 10.0.0.9, but packets addressed directly to 10.0.0.9 would instead reach some other host.

In some embodiments, a defined mutation policy may involve IP mutation and change the actual IP address of a host. In some embodiments, a defined mutation policy may modify links associated with various hosts to modify a topology aspect of a network.

In some embodiments, a defined mutation policy may call for a stateless container hop or a stateful container hop. A stateless container hop restarts the container, typically on a different host. A stateful container hop captures the container state, migrates the state a (typically different) host, and restarts the application thereon.

In some embodiments, a defined mutation may manipulate a honeypot such that a honeypot is injected, moved, or removed from a location. For example, a container may be injected such that is unreachable be good or otherwise benign users. Then, the system may monitor all traffic going into the honeypot container.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for mutating a network topology on which various containers run, the method comprising:
   assigning each of a plurality of hosts on a software defined network (SDN) an unchanging public virtual address that maps to a changing real address;
   receiving a mutation policy;
   receiving at least one mutation stimulus; and
   executing the mutation policy to enact a container mutation, wherein the mutation policy involves a management module in communication with at least one container upholding a mapping from the virtual address of a selected host to the real address of the selected host by issuing an update to an SDN controller upon a virtual-to-real address binding changing,
   wherein the container mutation that is enacted is defined by the received mutation policy and meets at least one constraint specified in the mutation policy and is based on the received at least one mutation stimulus, and
   wherein the SDN controller services both communications to the virtual address of the selected host and communications to the real address of the selected host.

2. The method of claim 1 wherein the at least one mutation stimulus is generated upon detection of malicious activity.

3. The method of claim 1 wherein the at least one mutation stimulus is generated according to a random, unpredictable schedule.

4. The method of claim 1, wherein at least one of the real address and the virtual address is defined by an IP address, a name, an IP address and a port combination, or a name and a port combination.

5. The method of claim 1 wherein executing the mutation policy to enact the container mutation includes changing an effective topology aspect of the SDN network.

6. The method of claim 1 wherein the mutation policy involves changing the real address without migrating a container on which a service executes.

7. The method of claim 1 wherein the mutation policy involves migrating a container on which a service executes from a first host to a second host, wherein the real address changes as a result of the container migration.

8. The method of claim 1 wherein executing the mutation policy to enact the container mutation includes:
   capturing a state of a container on a first host,
   migrating the state of the container to a second host, and
   restarting the container on the second host.

9. The method of claim 1 wherein executing the mutation policy to enact the container mutation includes:
injecting a honeypot container into the network, wherein the honeypot container is accessible only by threat actors, and
monitoring all traffic going into the honeypot container.

10. The method of claim 1 wherein the network is a software configurable network.

11. The method of claim 1 wherein the containers are virtual machines.

12. The method of claim 1 further comprising routing traffic from the unchanging virtual address to the real address, wherein a service resides on the real address.

13. The method of claim 1 wherein the at least one mutation stimulus is generated according to a prescribed schedule.

14. A system for mutating a network topology of a single network on which various containers run, the system comprising:
at least one processor executing instructions stored on memory to provide:
a host controller configured to assign each of a plurality of hosts on a software defined network (SDN) au unchanging public virtual address that maps to a changing real address;
a threat detection module configured to detect at least one mutation stimulus; and
a management module in communication with at least one container configured to:
receive a mutation policy, and
execute the mutation policy to enact a container mutation upon the threat detection module detecting the mutation stimulus, wherein the mutation policy involves the management module upholding a mapping from the virtual address of a selected host to the real address of the selected host-by issuing an update to SDN controller upon a virtual-to-real-address binding changing,
wherein the container mutation that is enacted is defined by the received mutation policy and meets at least one constraint specified in the mutation policy and is based on the detected at least one mutation stimulus, and
wherein the SDN controller services both communications to the virtual address of the selected host and communications to the real address of the selected host.

15. The system of claim 14 wherein the at least one mutation stimulus is generated upon detection of malicious activity.

16. The system of claim 14 wherein the at least one mutation stimulus is generated according to a random, unpredictable schedule.

17. The system of claim 14 wherein at least one of the real address and virtual address is defined by an IP address, a name, an IP address and a port combination, or a name and a port combination.

18. The system of claim 14 wherein the containers are virtual machines.

19. The system of claim 14 wherein the containers are Docker containers.

20. A method for mutating a network topology of a single network on which various containers run, the method comprising:
assigning each of a plurality of hosts on a software defined network (SDN) an unchanging public virtual address that maps to a changing real address;
receiving a mutation policy;
receiving at least one mutation stimulus; and
executing the mutation policy to enact a container mutation by a management module in communication with at least one container,
wherein the container mutation that is enacted is defined by the received mutation policy and meets at least one constraint specified in the mutation policy and is based on the received at least one mutation stimulus, and
wherein an SDN controller services both communications to the virtual address of the selected host and communications to the real address of the selected host mutation policy involves:
morphing an application on a first container into a honeypot application so that the first container becomes a honeypot container,
monitoring traffic received by the honeypot container, and
starting on a second container, a second application that was previously executing on the first container.

\* \* \* \* \*